(12) United States Patent
Atkins et al.

(10) Patent No.: US 10,560,707 B2
(45) Date of Patent: Feb. 11, 2020

(54) CHROMA SUBSAMPLING AND GAMUT RESHAPING

(71) Applicant: DOLBY LABORATORIES LICENSING CORPORATION, San Francisco, CA (US)

(72) Inventors: Robin Atkins, San Jose, CA (US); Jaclyn Anne Pytlarz, Sunnyvale, CA (US)

(73) Assignee: Dolby Laboratories Corporation, San Francisco, CA (US)

( * ) Notice: Subject to any disclaimer, the term of this patent is extended or adjusted under 35 U.S.C. 154(b) by 201 days.

(21) Appl. No.: 15/532,056

(22) PCT Filed: Mar. 24, 2016

(86) PCT No.: PCT/US2016/023813
§ 371 (c)(1),
(2) Date: May 31, 2017

(87) PCT Pub. No.: WO2016/154336
PCT Pub. Date: Sep. 29, 2016

(65) Prior Publication Data
US 2018/0007374 A1 Jan. 4, 2018

Related U.S. Application Data

(60) Provisional application No. 62/138,241, filed on Mar. 25, 2015.

(51) Int. Cl.
*H04N 19/33* (2014.01)
*H04N 19/132* (2014.01)
(Continued)

(52) U.S. Cl.
CPC ........... *H04N 19/33* (2014.11); *H04N 19/132* (2014.11); *H04N 19/167* (2014.11); *H04N 19/1887* (2014.11)

(58) Field of Classification Search
CPC .... H04N 19/33; H04N 19/167; H04N 19/132; H04N 19/1887; H04N 19/30; H04N 19/85
See application file for complete search history.

(56) References Cited

U.S. PATENT DOCUMENTS 8,422,546 B2 *  4/2013  Lin .................... H04N 19/176
                                                    375/240
8,837,826 B1 *  9/2014  Gaddy ................ H04N 19/132
                                                    382/166

(Continued)

FOREIGN PATENT DOCUMENTS

EP      2023601       2/2009
WO      2002/048960   6/2002

(Continued)

OTHER PUBLICATIONS

Stessen J. et al., "Chromaticity Based Color Signals for Wide Color Gamut and High Dynamic Range", ISO/IEC JTC1/SC29/WG11 MPEG 2014/M35065, Oct. 2014, pp. -18.

(Continued)

*Primary Examiner* — Wesley J Tucker

(57) ABSTRACT

Downsampled video content is generated in a subsampling color space from linearized video content in the subsampling color space. The linearized video content represents a first spatial dimension, whereas the downsampled video content represents a second spatial dimension lower than the first spatial dimension. Opponent channel data is derived in a transmission color space from the downsampled video content. Output video content is generated from luminance data in the linearized video content and the opponent channel data in the transmission color space. The output video content may be decoded by a downstream recipient device to generate video content in an output color space.

22 Claims, 15 Drawing Sheets

(51) Int. Cl.
*H04N 19/167* (2014.01)
*H04N 19/169* (2014.01)

(56) References Cited

U.S. PATENT DOCUMENTS

| | | | |
|---|---|---|---|
| 2009/0110054 A1* | 4/2009 | Kim | H04N 19/647 375/240.1 |
| 2011/0255101 A1 | 10/2011 | Edge | |
| 2016/0269733 A1* | 9/2016 | Tourapis | H04N 19/189 |
| 2017/0085889 A1* | 3/2017 | Baylon | H04N 19/124 |
| 2017/0134731 A1* | 5/2017 | Tourapis | H04N 1/646 |
| 2018/0048892 A1* | 2/2018 | Norkin | H04N 1/60 |
| 2018/0131841 A1* | 5/2018 | Mahmalat | H04N 1/6058 |

FOREIGN PATENT DOCUMENTS

| | | |
|---|---|---|
| WO | 2004/068845 | 8/2004 |
| WO | 2014/130343 | 8/2014 |
| WO | 2014/132096 | 9/2014 |
| WO | 2014/193531 | 12/2014 |
| WO | 2014/204865 | 12/2014 |

OTHER PUBLICATIONS

Mir J. et al., "Rate distortion analysis of high dynamic range video coding techniques", 2015 IEEE International Conference on Image Processing (ICIP), pp. 237-241, Sep. 27, 2015 XP032826464.

SMPTE Standard, "Y'D'zD'x Color-Difference Computations for High Dynamic Range X'Y'Z' Signals", ST 2085:2015: Y'ZD'X Color-Difference Computations for High Dynamic Range X'Y'Z' Signals, pp. 1-7, Jun. 21, 2015 XPO55273054. Retrieved from the Internet: http://ieeexplore.ieee.org/stampPDF/getPDF.jsp?tp=&arnumber=7395514.

Pytlarz J. et al., "Overview of IPT-PQ Color Space", 113, MPEG Meeting, Oct. 19, 2015-Oct. 23, 2015; Geneva (Motion Picture Expert Group or ISO/IEC JTC1/SC29/WG11), No. m37266, Oct. 21, 2015, XP030065634.

Baylon D. et al, "Response to Call for Evidence for HDR and WCG Video Coding: Arris, Dolby and Interdigital", 112. MPEG Meeting; Jun. 22, 2015-Jun. 26, 2015; Warsaw; (Motion Picture Expert Group or ISO/IEC JTC1/SC29/WG11), No. m36264, Jun. 23, 2015, XP030064632.

Ebner F. et al., "Development and testing of a color space (ipt) with improved hue uniformity", Proc. 6th Color Imaging Conference: Color Science Systems and Applications, IS&T, Scottsdale Arizona, pp. 8-13, Nov. 1998.

SMPTE ST 2084:2014, "High Dynamic Range EOTF of Mastering Reference Displays", 2014.

Barten, Peter G.J. "Contrast Sensitivity of the Human Eye and its Effects on Image Quality" 1999.

Barten, Peter G.J "Formula for the Contrast Sensitivity of the Human Eye" Proc. of the SPIE-IS&T Electronic Imaging, vol. 5294, pp. 231-238, 2004.

Miller, Scott "A Perceptual EOTF for Extended Dynamic Range Imagery" SMPTE, 2014.

IEC 61966-2-4, International Standard, "Multimedia Systems and Equipment-Colour Measurement and Management—Part 2-4: Colour Management—Extended-Gamut YCC Colour Space for Video Applications—xvYCC" IEC:2006.

Poynton, Charles "Digital Video and HDTV" Morgan-Kaufmann, 2003.

Wikipedia, CIELUV, pp. 1-4, Jun. 2017.

Stessen, J. et al "Chromaticity Based Color Signals" Jul. 2014, ISO/IEC JTC1/SC29/WG11, pp. 1-16.

\* cited by examiner

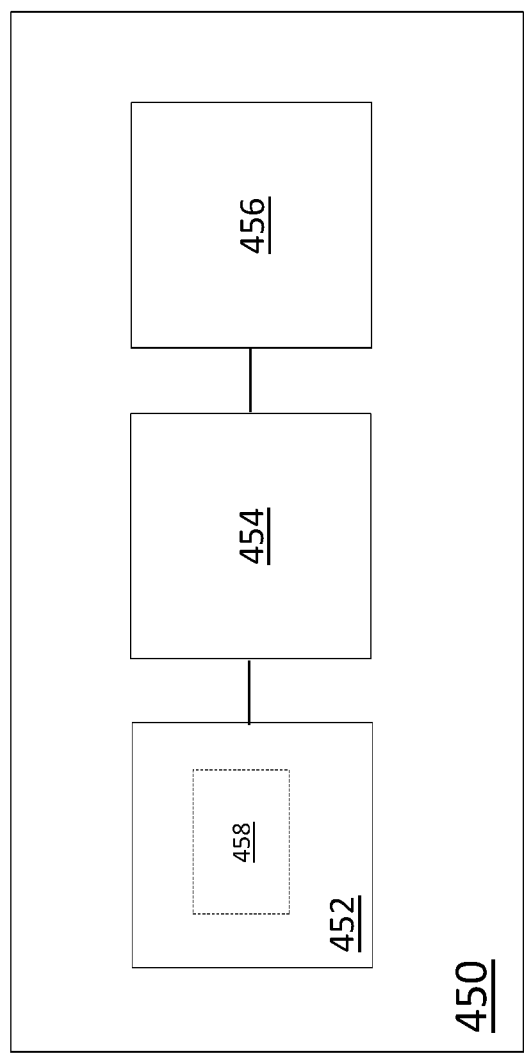

```
┌─────────────────────────────────────────────┐
│ decode luminance data and downsampled opponent │
│ channel data from video content in a transmission │
│              color space 552                │
└─────────────────────────────────────────────┘
                      │
┌─────────────────────────────────────────────┐
│ generate upsampled opponent channel data from the │
│    downsampled opponent channel data 554    │
└─────────────────────────────────────────────┘
                      │
┌─────────────────────────────────────────────┐
│ generate video content in an output color space from │
│  the luminance data decoded from the video content │
│   in the transmission color space and the upsampled │
│           opponent channel data 556         │
└─────────────────────────────────────────────┘
```

FIG. 5B

CHROMA SUBSAMPLING AND GAMUT RESHAPING

CROSS-REFERENCE TO RELATED APPLICATION

This application claims the benefit of priority to U.S. Provisional Patent Application Ser. No. 62/138,241, filed on Mar. 25, 2015, which is hereby incorporated by reference in its entirety.

TECHNOLOGY

The present invention relates generally to image processing, and in particular, to encoding, decoding, and representing video images.

BACKGROUND

Video compression techniques can be used to generate video content for a given bit rate constraint in a video output signal. However, these techniques frequently introduce visual artifacts caused by downsampling operations for video content compression.

In addition, when video content is encoded into a video signal, frequently, as appreciated by the inventors, only a small fraction of an available code word space is actually occupied by code words in the encoded video content in the video signal. This can be detrimental for video quality, especially when the available code word space is already relatively small. As a result, significant coding errors, quantization errors, etc., can be introduced in the encoded video content.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 4A and FIG. 4B illustrate example video encoder and decoder;

FIG. 5A and FIG. 5B illustrate example process flows; and

DESCRIPTION OF EXAMPLE EMBODIMENTS

Figure 1A:
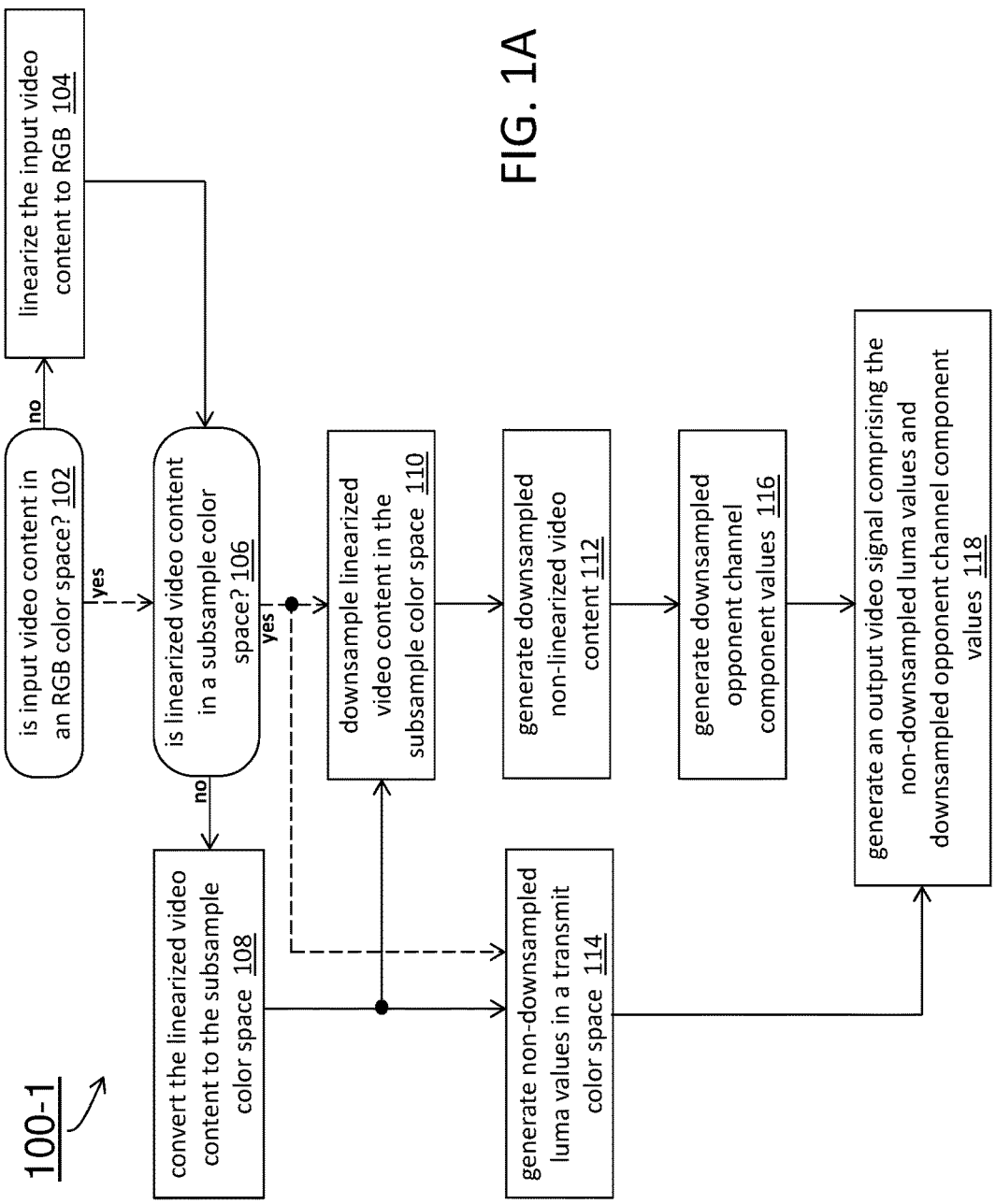
FIG. 1A and FIG. 1B illustrate example process flows for generating video content comprising downsampled image data in opponent channels.

Example embodiments, which relate to encoding, decoding, and representing video images, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. DOWNSAMPLING IMAGE DATA IN OPPONENT CHANNELS
3. EXAMPLE INPUT IMAGE DATA IN R'G'B' COLOR SPACES
4. EXAMPLE INPUT IMAGE DATA IN IPT-PQ COLOR SPACES
5. IMAGE CONSTRUCTION BASED DOWN-SAMPLED IMAGE DATA
6. EXAMPLE IMAGE CONSTRUCTION IN R'G'B' COLOR SPACES
7. EXAMPLE IMAGE CONSTRUCTION IN IPQ-PQ COLOR SPACES
8. RESHAPING COLOR GAMUT
9. EXAMPLE VIDEO CODECS
10. EXAMPLE PROCESS FLOWS
11. IMPLEMENTATION MECHANISMS—HARDWARE OVERVIEW
12. EQUIVALENTS, EXTENSIONS, ALTERNATIVES AND MISCELLANEOUS

1. GENERAL OVERVIEW

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Video codecs may be used to generate or process video content comprising images to be rendered with a wide variety of display devices. Chroma subsampling and gamut reshaping techniques as described herein can be used to provide efficient compression in encoding video content, while avoiding or reducing visual artifacts in the encoded video content released to downstream devices.

As a part of chroma subsampling, chroma data in a sequence of input images can be downsampled to lower spatial resolutions for the purpose of transmission efficiency. Downsampling operations to reduce the spatial resolution can be performed in a subsampling color space such as a linear color space, an XYZ color space, etc., in which chroma data and luminance data are relatively cleanly separated into separate components of the subsampling color space. Output video content can be generated at least in part from the downsampled chroma data and transmitted in a transmission color space such as a non-linear color space, a color opponent color space, an Y'DzDx color space, a perceptually quantized (PQ) color space, etc. The transmission color space may be supported by video signal formats widely implemented in industry.

Downsampling in some color spaces (e.g., YDzDx color spaces, Y'DzDx color spaces, etc.) may incur quantization errors, coding errors, etc., among luminance data as well as chroma data. As the human visual system is relatively sensitive to distortions in luminance information, artifacts may be relatively easily perceivable in luminance data with relatively large quantization errors, coding errors, etc.

Under techniques as described herein, downsampling operations may be performed on chroma data in the subsampling color space in which the chroma data is separated into different components of the subsampling color space from luminance data. As a result, crosstalk errors between chroma data and luminance data are minimized under these techniques. Chroma sampling as described herein eliminates redundant information in chroma data, while quantization errors, coding errors, etc., incurred in the chroma data produce little if any visual artifacts, as the human visual system is relatively insensitive to distortions in chroma information.

Additionally, as the downsampling operations are performed in a linear color space rather than in a non-linear color space, relatively large variations in quantization errors, coding errors, etc., can be avoided or reduced under the techniques as described herein. A non-linear color space such as a PQ color space, etc., may cover a relatively large dynamic range and comprise a distribution of luma code words with different quantization precisions in terms of luminance values. Luminance differences (e.g., 1, etc.) between adjacent luma code word values in the non-linear color space may vary greatly. Downsampling operations performed in the non-linear color space could introduce highly variable quantization errors, coding errors, etc., in terms of luminance values. While downsampling in the non-linear color space may perform relatively uniform quantization errors, coding errors, etc., in terms of code words (e.g., PQ code words, etc.) in the non-linear color space, corresponding quantization errors, coding errors, etc., in terms of luminance values may vary greatly depending on luminance regions. Because of the relatively high variations in quantization errors, coding errors, etc., in terms of luminance values, rendering video content downsampled in a non-linear color space such as a PQ color space may be relatively prone to generate visual artifacts.

In contrast, under techniques as described herein, while the output video content may be transmitted or delivered in a (e.g., a standard-compliant, a widely implemented, etc.) non-linear color space for the purpose of carrying the output video content in supported video signals, downsampling operations on chroma data is not performed in the non-linear color space but rather in a linear color space. As a result, relatively highly varied errors and accompanying visual artifacts caused by downsampling operations under other approaches can be avoided under the techniques as described herein.

By way of example, input video content is received for the purpose of generating output video content. The input video content may, but is not limited to, be in an input color space such as an R'G'B' color space, an IPT-PQ color space, a gamma compressed color space, a gamma expanded color space, a sigmoid color space, etc. In response to determining that the input video content is not linearized, the input video content may be converted into linearized video content or video content in a linear color space (e.g., an RGB color space, an IPT color space, etc.) related to the input color space. The conversion from the input video content to the linearized video content may be performed based at least in part on a first forward mapping between the input color space and the linear color space related to the input color space.

An example description of the IPT-PQ color space may be found in PCT Application PCT/US2014/016304, filed on Feb. 13, 2014, titled "Display management for high dynamic range video," by R. Atkins et al., which is incorporated herein by reference in its entirety. The IPT-PQ color space combines elements of the IPT color space, described in "*Development and testing of a color space (ipt) with improved hue uniformity*", by F. Ebner and M. D. Fairchild, in Proc. $6^{th}$ Color Imaging Conference: Color Science, Systems, and Applications, IS&T, Scottsdale, Ariz., November 1998, pp. 8-13, which is incorporated herein by reference in its entirety, and perceptual quantization (PQ) for images with high dynamic range, for example, as described in SMPTE ST 2084:2014 "High Dynamic Range EOTF of Mastering Reference Displays," which is incorporated herein by reference in its entirety. Compared to the traditional gamma curve, which represents the response curve of a physical cathode ray tube (CRT) device and coincidentally may have a very rough similarity to the way the human visual system responds, a PQ curve, as determined by SMPTE ST 2084, imitates the true visual response of the human visual system using a relatively simple functional model.

The linearized video content can be further converted to a subsampling color space such as an XYZ color space, etc., in which chroma data is separated from luminance data. In an example implementation, this conversion from the linear color space to the subsampling color space is performed with a conversion matrix.

Downsampling operations are then performed on the linearized video content in the subsampling color space. Any of a variety of resampling methods can be used to downsample the linearized video content in the subsampling color space. For example, the linearized video content may be downsampled using a bilinear interpolation based method or algorithm.

In some embodiments, luminance values in the subsampling color space (e.g., an XYZ color space, etc.) before the downsampling operations are mapped non-linearly to luma values in the transmission color space (e.g., an Y'DzDx color space, etc.). The downsampled linearized video content in the subsampling color space (e.g., an XYZ color space, etc.) may be mapped non-linearly to downsampled non-linearized video content in a pre-transmission color space (e.g., an X'Y'Z' color space, etc.).

The downsampled linearized video content in the pre-transmission color space (e.g., an X'Y'Z' color space, etc.) can be used to generate downsampled opponent channel component values (e.g., Dz and Dx values, etc.) in a transmission color space. The luma values nonlinearly mapped to from the luminance values before the downsampling operations and the downsampled opponent channel component values in the transmission color space may then be used to generate downsampled non-linearized video content in the transmission color space (e.g., an Y'DzDx color space, etc.) that can be carried in a specific sampling format (e.g., a 4:2:2 sampling format, a 4:2:0 sampling format, etc.).

The downsampled non-linearized video content representing a downsampled version of the input images may be directly or indirectly transmitted or delivered as the output video content to one or more downstream recipient devices from an upstream device that generates the downsampled non-linearized video content in the transmission color space. In some embodiments, metadata may be sent with the output video content to the downstream recipient devices for the purpose of indicating that the output video content comprises specific video content with the luma values nonlinearly mapped to from the luminance values before the downsampling operations and the downsampled opponent channel component values in the transmission color space.

The downstream non-linearized video content may be received and processed by a recipient device to construct output images corresponding to the input images used to generate the downstream non-linearized video content. In some embodiments, the luma values nonlinearly mapped to from the luminance values before the downsampling operations and the downsampled opponent channel component values may be retrieved or decoded from downsampled non-linearized video content in the transmission color space (e.g., an Y'DzDx color space, etc.).

In some embodiments, the downsampled opponent channel component values may be upsampled to opponent channel component values to a higher spatial resolution. The higher spatial resolution of the upsampled opponent channel component values may, but is not limited to, be the same as the original spatial resolution in the input images that are used to generate the output video content. In some embodiments, the upsampled opponent channel component values may be obtained from the downsampled opponent channel component values using a bilinear resampling method.

The (non-downsampled) luma values decoded from the received video content and the upsampled opponent channel component values, which collectively represent non-linearized video content in the transmission color space (e.g., an Y'DzDx color space, etc.), may be used to derive non-linearized video content in a post-transmission color space (e.g., an X'Y'Z' color space, etc.). The post-transmission color space may or may not be the same as the pre-transmission color space as previously mentioned.

The non-linearized video content in the post-transmission color space (e.g., an X'Y'Z' color space, etc.) can be mapped non-linearly to linearized video content in a linear color space (e.g., an XYZ color space, etc.) related to the post-transmission color space (e.g., an X'Y'Z' color space, etc.).

In some embodiments, the linearized video content in the linear color space (e.g., an XYZ color space, etc.) is converted to linearized video content in another linear color space (e.g., an RGB color space, an IPT color space, etc.) that is related to an output color space (e.g., an R'G'B' color space, an IPT-PQ color space, etc.), for example, with a conversion matrix between the two linear color spaces.

Additionally, optionally, or alternatively, the linearized video content in the linear color space (e.g., an RGB color space, an IPT color space, etc.) related to the output color space may be mapped to non-linearized video content in the output color space (e.g., an R'G'B' color space, an IPT-PQ color space, etc.), for example, based on an inverse mapping. In some embodiments, the non-linearized video content may be outputted to a recipient unit or module for rendering video content on a display.

Additionally, optionally, or alternatively, color gamut reshaping techniques can be used to better utilize a code word space available in a color space. A color gamut or a portion thereof to be reshaped in the color space may be standard based (e.g., a Rec. 2020 color gamut, a P3 color gamut, etc.), device dependent, scene dependent, individual image dependent color gamut, etc.

Examples of color spaces in which color gamut reshaping techniques as described herein may be applied may include, but are not limited to only, any of: an RGB color space, a R'G'B' color space, an IPT color space, an IPT-PQ color space, a gamma compressed color space, a gamma expanded color space, an XYZ color space, an X'Y'Z' color space, an input color space, an output color space, a subsampling color space, an upsampling color space, a pre-transmission color space, a post-transmission color space, a transmission color space, etc.

To perform gamut reshaping, a center point, an outer boundary, etc., of the color gamut may be determined. Radii and angles from the center point to first points on the outer boundary of the color gamut may be computed. Similarly, radii and angles from the center point to second points on a boundary of the code word space may also be computed. Reshaping gains for various angles may be computed based on the radii of the first points on the outer boundary of the color gamut and the radii of the second points on the boundary of the code word space. The reshaping gains and the angles of the first points on the outer boundary of the color gamut collectively represent a color gamut reshaping function.

In some embodiments, the color gamut reshaping function may be used to map component values encoded in the color gamut to be reshaped to new component values that fully or better utilize the code word space available in the color space. For example, a radius and an angle may be computed for a pixel. The radius may be scaled by a reshaping gain corresponding to the angle of the pixel. In an example implementation, an interpolation function may be used to generate a specific reshaping gain for the angel of the pixel based on the color gamut reshaping function. Radii of pixels as scaled by the color gamut reshaping function and angles of the pixels may be used to generate the new component values.

In some embodiments, the same color gamut reshaping function can be signaled to or generated by a downstream video decoder and used to recover or reconstruct a version of the original component values based on the new component values generated based on the scaled radii of the pixels in relation to the center point.

In some example embodiments, mechanisms as described herein form a part of a media processing system, including but not limited to any of: video processing system, video codec system, studio system, streaming server, cloud-based content service system, a handheld device, game machine, television, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. DOWNSAMPLING IMAGE DATA IN OPPONENT CHANNELS

Figure 1B:
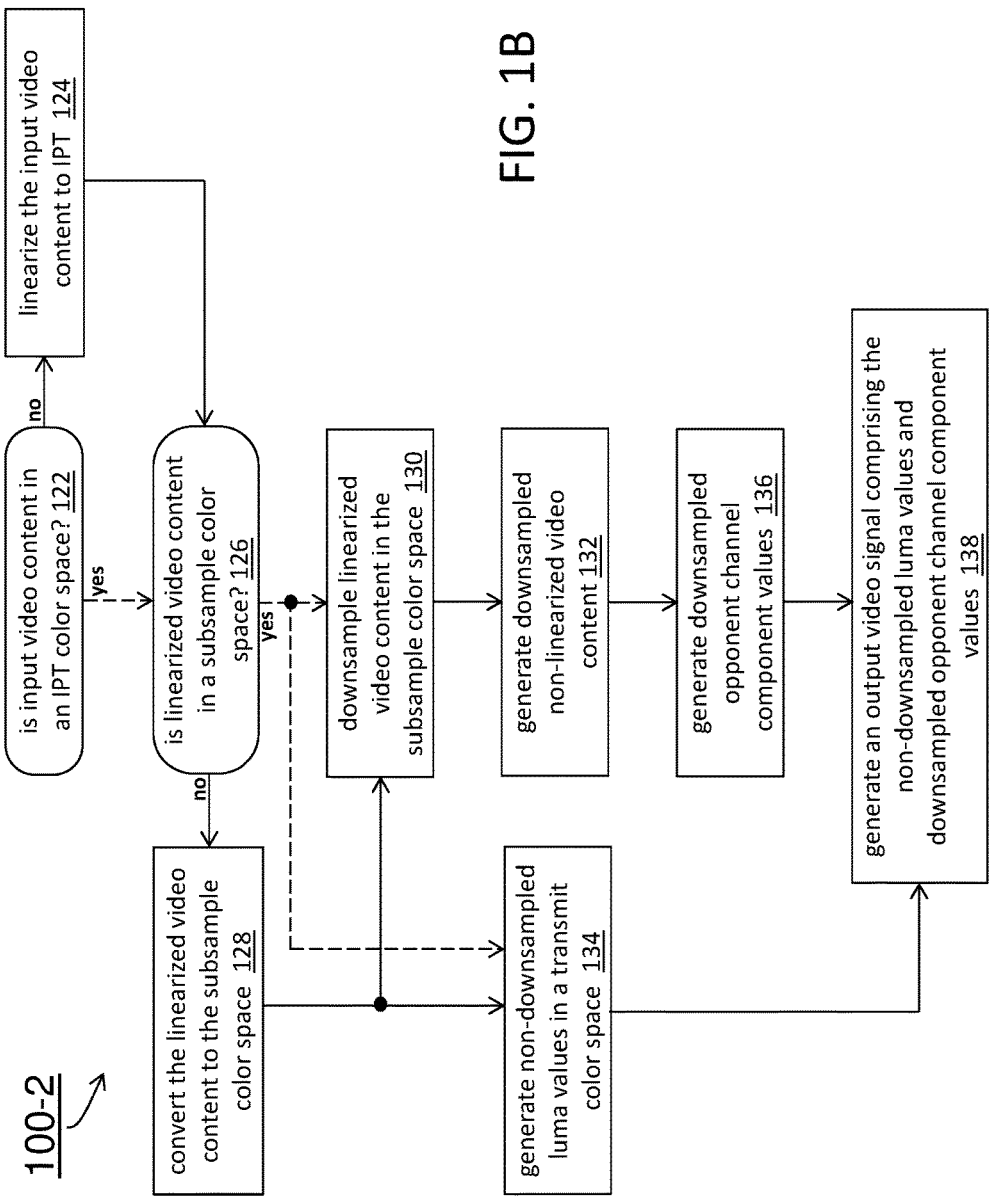

FIG. 1A and FIG. 1B illustrate example process flows 100-1 and 100-2 for generating video content comprising downsampled image data in opponent channels. In some embodiments, a video encoder (e.g., a video codec, a video transcoder, etc.) as described herein may be configured to perform one or both of the process flows.

In an example embodiment, the video encoder is configured to receive input video content that comprises a sequence of input images. The sequence of input images may represent one or more scenes each of which comprises a plurality input images in the sequence of input images. As used herein, an "input image" may refer to wide or high dynamic range image data (e.g., a scene-referred image captured by a high-end image acquisition device, a master copy from a studio system, a mezzanine version for generating video streaming packages, etc.). An input image may be in any color space (e.g., a RGB color space, a R'G'B' color space, an IPT color space, a gamma related color space, etc.) that supports a high dynamic range and/or a wide color gamut. An input image may comprise component values such as RGB component values, R'G'B' component values, XYZ component values, X'Y'Z' component values, gamma related component values, etc., carried in any sampling format such as a 4:4:4 sampling format, a 4:4:0 sampling format, a 4:2:2 sampling format, etc., that supports a high dynamic range and/or a wide color gamut.

3. EXAMPLE INPUT IMAGE DATA IN R'G'B' COLOR SPACES

Techniques as described herein can be applied to input video content in an R'G'B' color space. As illustrated in FIG. 1A, in process flow 100-1, the video encoder receives the input video content comprising the sequence of input images in an R'G'B' color space. In block 102, the video encoder determines whether the input video content (or input images therein) is encoded in a linear color space.

A linear color space as described herein may be linear to a color space in which one or more components of the color space can be linearly transformed to luminance values. Examples of linear color spaces include, but are not limited to only, any of: RGB color spaces, XYZ color spaces, linear transformations of an XYZ color space, IPT color spaces, etc. Video content encoded in a linear color space may be referred to as linearized video content. Conversely, video content encoded in a non-linear color space may be referred to as non-linearized video content.

In response to determining that the input video content is linearized video content, the video encoder skips block 104. The process flow goes directly to block 106. On the other hand, in response to determining that the input video content is not linearized video content, the video encoder converts the input video content into linearized video content in block 104. The process flow then goes to block 106.

In block 104, the video encoder processes each input image in the sequence of input images in the input video content, and converts or linearize image data in the sequence of input images from a non-linear input color space (an R'G'B' color space in the present example) to a linear color space (e.g., a RGB color space, etc). An input image in the sequence of input images, denoted as "IMG", comprises non-linear input code words (e.g., perceptually quantized or PQ code words, etc.) encoded or quantized in the R'G'B' color space that supports a specific color gamut (e.g., P3, etc.), a specific white point (e.g., D65, etc.), etc. The input image may have a specific spatial resolution (e.g., 4 k, 8 k, etc.). In some embodiments, the R'G'B' color space is represented as a space of R', G', and B' code words available to encode video content.

R', G', and B' code words represented in the R'G'B' color space may be perceptually quantized (PQ), gamma compressed (GC), etc., and may be mapped to R, G and B code words in the RGB color space in one or more of a variety of ways (e.g., by transfer functions such opto-electro transfer functions, by lookup tables (LUTs) such as 3D-LUTs, by fixed or parametrized mapping curves, by piecewise line segments with offsets, slopes and pivots, by matrixes, by power functions, by analytical functions, by sigmoid functions, by logarithmic functions, by integration expressions, etc.).

Figure 2A:
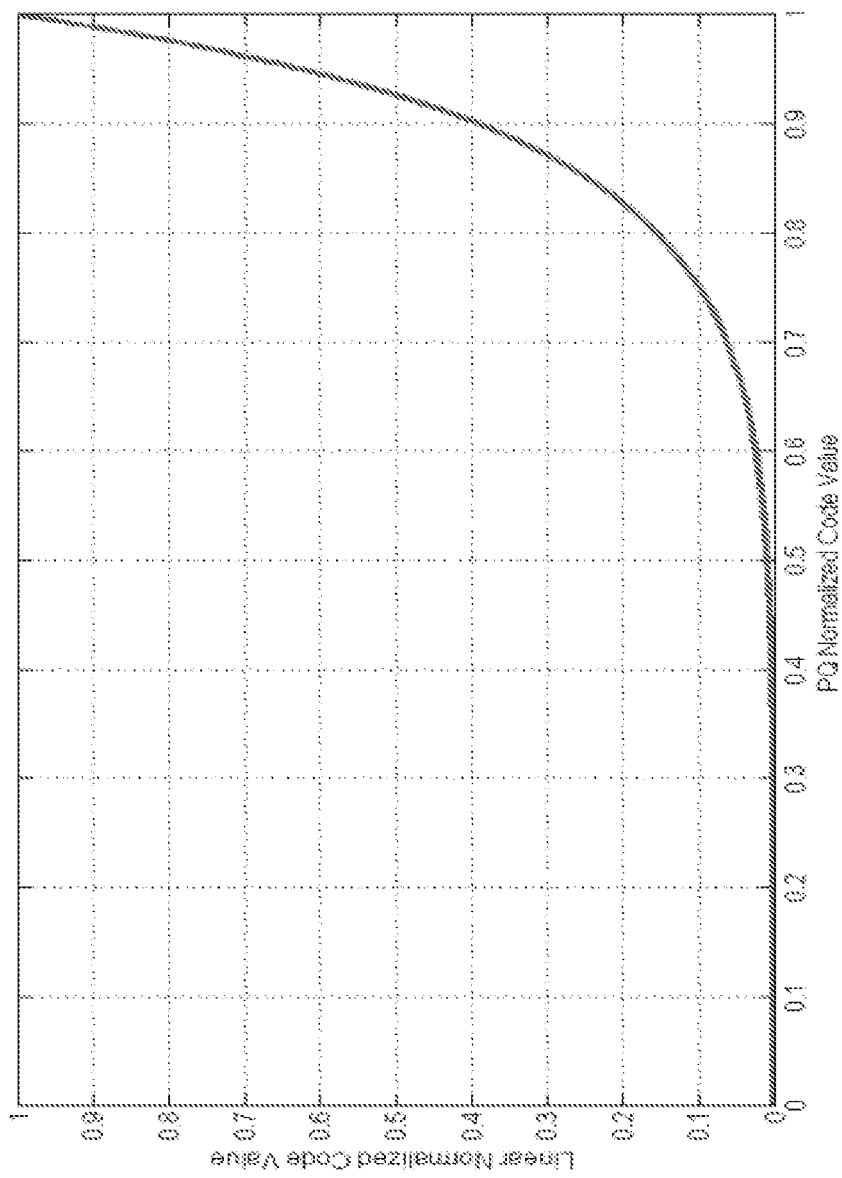
FIG. 2A illustrates an example forward transformation from a non-linear color space to a linear color space.

In some embodiments, the video encoder converts the R', G', and B' code words in the input image "IMG" to R, G and B code words in the RGB color space, based on a first forward transformation F1, which is defined as a forward transformation from the R'G'B' color space to the RGB color space. The forward transformation F1 may be implemented by a transfer function as illustrated in FIG. 2A. In an embodiment, F1 may be defined by the Electro Optical Transfer Function (EOTF) of the received signal, such as the one defined in SMPTE ST2084. In some embodiments, R', G', and B' code words available in the R'G'B' color space, as represented by the horizontal coordinate in FIG. 2A, may be normalized to a specific range such as zero (0) to one (1) in the first transformation F1. Similarly, R, G, and B code words available in the RGB color space, as represented by the vertical coordinate in FIG. 2A, may be normalized to a specific range such as zero (0) to one (1) in the first transformation F1.

The conversion from the R', G', and B' code words in the input image "IMG" to the R, G and B code words in the RGB color space, based on the first forward transformation F1, may be represented in the following expression:

$$\text{IMG\_linear}\begin{bmatrix} R_1 & \dots & R_n \\ G_1 & \dots & G_n \\ B_1 & \dots & B_n \end{bmatrix} = F1(IMG) \quad (1)$$

where IMG_linear[ . . . ] is a (e.g., 3×N, etc.) matrix representing the linearized video content (or an image in a sequence of images therein) comprising the R, G and B code words in the RGB color space. The linearized video content (or an image in a sequence of images therein) may comprise an array or a matrix of RGB component values in the RGB color space.

In block 106, the video encoder determines whether the linearized video content is encoded in a subsampling color space. A subsampling color space as described herein may refer to a specific linear color space in which downsampling operations (e.g., in spatial dimensions, etc.) may be performed as a part of compressing video content for transmission or delivery to downstream recipient devices.

In response to determining that the linearized video content is encoded in the subsampling color space, the video encoder skips block 108. The process flow goes directly to block 110.

On the other hand, in response to determining that the linearized video content is not encoded in the subsampling color space, the video encoder converts the linearized video content (in the RGB color space in this example) to the subsampling color space in block 108. The process flow then goes to block 110.

For the purpose of illustration, the subsampling color space is an XYZ color space. The conversion from the RGB color space to the XYZ color space in block 108 may be represented in the following expression:

$$\begin{bmatrix} X \\ Y \\ Z \end{bmatrix} = M * \text{IMG\_linear} \begin{bmatrix} R_1 & \ldots & R_n \\ G_1 & \ldots & G_n \\ B_1 & \ldots & B_n \end{bmatrix} \quad (2)$$

where $$\begin{bmatrix} X \\ Y \\ Z \end{bmatrix}$$

is a (e.g., 3×N, etc.) matrix representing video content (or an image in a sequence of images therein) in the XYZ color space, and M represents a (e.g., 3×3, etc.) transformation matrix from the RGB color space to the XYZ color space.

In a non-limiting example, as shown in expression (2), the video content in the XYZ color space may comprise an array or a matrix of XYZ component values in the XYZ color space. The transformation matrix M from the RGB color space to the XYZ color space may, but is not limited to, be a (e.g., 3×3, etc.) matrix "P3D65_2_XYZ" as given in the following expression:

$$P3D65\_2\_XYZ = \begin{matrix} [0.4866 & 0.2657 & 0.1982 \\ 0.2290 & 0.6917 & 0.0793 \\ 0.0000 & 0.0451 & 1.0439] \end{matrix} \quad (3)$$

In block 110, the video encoder downsamples the video content in the XYZ color space to generate downsampled video content. Any in a number of resampling methods may be used by the video encoder to generate the downsampled video content. A resampling method for downsampling video content as described herein may include, but is not limited to only, an interpolation-based method such as bilinear interpolation, bicubic interpolation, etc.

In some embodiments, to obtain the downsampled video content, the video encoder may use bilinear interpolation to scale down the spatial resolution of the linearized video content in the XYZ color space, as given in the following expression:

$$\begin{bmatrix} X_{D5} \\ Y_{D5} \\ Z_{D5} \end{bmatrix} = \text{resize}([X, Y, Z], 1/2, \text{bilinear}) \quad (4)$$

where $$\begin{bmatrix} X_{D5} \\ Y_{D5} \\ Z_{D5} \end{bmatrix}$$

is a (e.g., 3×M, etc.) matrix representing the downsampled video content (which may comprise a sequence of downsampled images) in the XYZ color space, and resize([X,Y,Z],½,bilinear) represents the same bilinear interpolation operations performed individually on each component X, Y, or Z to scale down (e.g., reduced to half of, etc.) each linear spatial resolution in both horizontal and vertical directions. For example, the number of pixels (or the amount of image data) in the downsampled video content after the bilinear interpolation operations in expression (4) may be one quarter (¼) of the number of pixels (or the amount of image data) in the video content before the bilinear interpolation operations in expression (4).

In block 112, the video encoder processes each downsampled image in the sequence of downsampled images represented by the downsampled video content, and converts downsampled image data in the sequence of downsampled images from the XYZ color space to a pre-transmission color space (e.g., an X'Y'Z' color space, etc.).

Figure 2B:
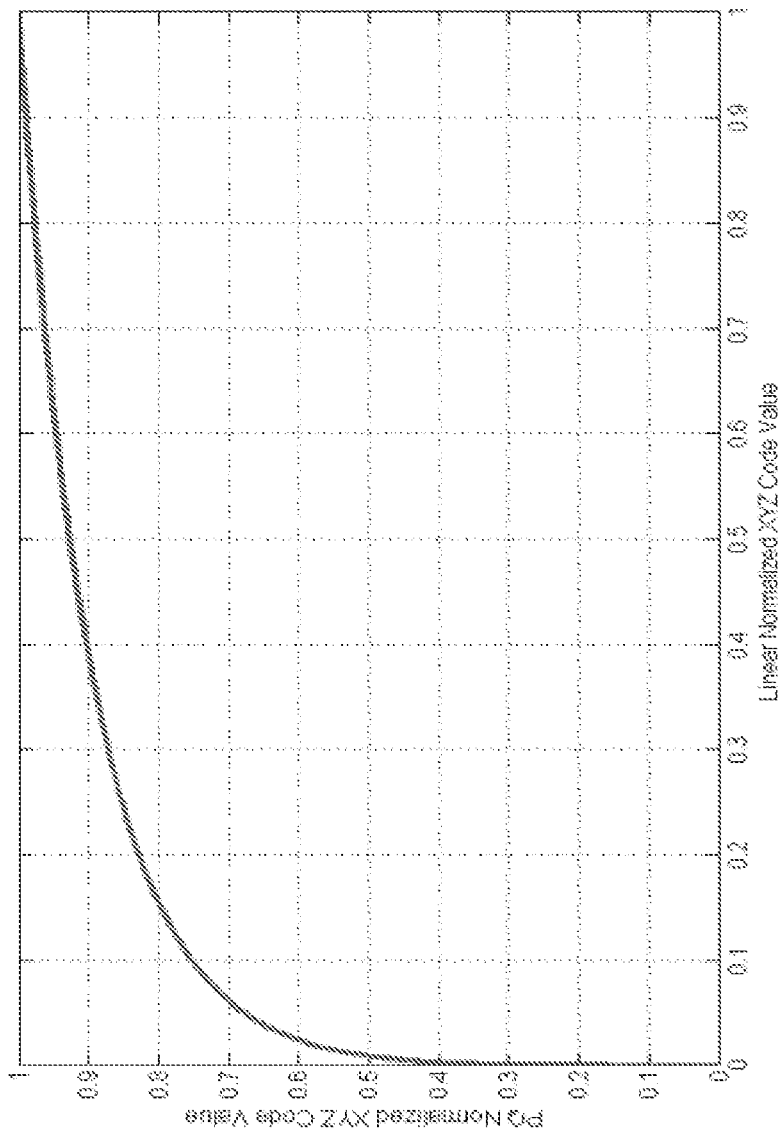
FIG. 2B illustrates an example inverse transformation from a non-linear color space to a linear color space.

Code words represented in the X'Y'Z' color space may be perceptually quantized (PQ), gamma compressed (GC), etc., and may be (e.g., inversely, etc.) mapped to from X, Y and Z code words in the XYZ color space in one or more of a variety of ways. In a non-limiting example, the video encoder converts the X, Y and Z code words in the XYZ color space to X', Y' and Z' code words in the X'Y'Z' color space, based on a second inverse transformation F2', which is defined as an inverse transformation from the XYZ color space to the X'Y'Z' color space. The second inverse transformation F2' may be implemented by a transfer function as illustrated in FIG. 2B. In some embodiments, X', Y', and Z' code words available in the X'Y'Z' color space, as represented by the vertical coordinate in FIG. 2B, may be normalized to a specific range such as zero (0) to one (1) in the second inverse transformation F2'. Similarly, X, Y, and Z code words available in the XYZ color space, as represented by the horizontal coordinate in FIG. 2A, may be normalized to a specific range such as zero (0) to one (1) in the second inverse transformation F2'.

The conversion from the X, Y and Z code words in the XYZ color space to the X'Y'Z' code words in the X'Y'Z' color space, based on the second inverse transformation F2', may be represented in the following expression:

$$\begin{bmatrix} X'_{D5} \\ Y'_{D5} \\ Z'_{D5} \end{bmatrix} = F2'\left(\begin{bmatrix} X_{D5} \\ Y_{D5} \\ Z_{D5} \end{bmatrix}\right) \quad (5)$$

where $$\begin{bmatrix} X'_{D5} \\ Y'_{D5} \\ Z'_{D5} \end{bmatrix}$$

is a (e.g., 3×M, etc.) matrix representing downsampled non-linearized video content (which comprises a sequence of downsampled images in the X'Y'Z' color space) comprising the $X'_{DS}$, $Y'_{DS}$ and $Z'_{DS}$ code words in the X'Y'Z' color space. In an embodiment, F2' may represent the inverse EOTF (or OETF) of the input signal, such as the OETF defined in SMPTE ST 2084.

In block 116, the video encoder processes each downsampled image in a sequence of downsampled images represented by the downsampled non-linearized video content, and generates opponent channel code words, Dz and Dx, based on $X'_{DS}$, $Y'_{DS}$ and $Z'_{DS}$ code words in each downsampled image in the sequence of downsampled images, as shown in the following expressions:

$$Dz=[Y'_{DS}-Z'_{DS}]/2 \quad (6a)$$

$$Dx=[Y'_{DS}-X'_{DS}]/2 \quad (6b)$$

In block 114, the video encoder maps luminance values Y in the XYZ color space obtained before downsampling operations performed in block 110 to (non-linear) luma value Y', as shown in the following expression:

$$Y'=F2'(Y) \quad (7)$$

where F2' may be the same second inverse transformation used in expression (5), and Y may be obtained from expression (2).

In block 118, the video encoder generates output video content comprising the opponent channel code words Dz and Dx obtained from the downsampled non-linearized video content and the luma values Y' mapped from the pre-downsampled luminance values in a transmission color space (e.g., an Y'DzDx color space, etc.). The output video content may be transmitted (e.g., by the video encoder, etc.), delivered, etc., to one or more recipient modules, units, devices, etc.

In an example embodiment, the output video content comprises a sequence of output images that corresponds to the sequence of input images in the input video content. An output image may comprise component values in the transmission color space that are carried in a specific sampling format (e.g., a 4:4:0 sampling format, a 4:2:2 sampling format, a 4:2:0 sampling format, etc.).

4. EXAMPLE INPUT IMAGE DATA IN IPT-PQ COLOR SPACES

Techniques as described herein can be applied to input video content in color spaces other than an R'G'B' color space. By way of example, in process flow 100-2 as illustrated in FIG. 1B, the video encoder receives the input video content comprising the sequence of input images in an IPT-PQ color space. In block 122, the video encoder determines whether the input video content (or input images therein) linearized video content, for example, whether the input video content is encoded in a linear color space to a subsampling color space.

In response to determining that the input video content is linearized video content, the video encoder skips block 124. The process flow goes directly to block 126. On the other hand, in response to determining that the input video content is not linearized video content, the video encoder converts the input video content into linearized video content in block 124. The process flow then goes to block 126.

In block 124, the video encoder processes each input image in the sequence of input images in the input video content, and converts or linearize image data in the sequence of input images from a non-linear input color space (an IPT-PQ color space in the present example) to a linear color space (e.g., a IPT color space, etc). An input image in the sequence of input images, denoted as "IMG2", comprises non-linear input code words (e.g., perceptually quantized or PQ code words, etc.) encoded or quantized in the IPT-HDR color space that supports a specific color gamut, a specific white point, etc. The input image may have a specific spatial resolution (e.g., 4 k, 8 k, etc.). In some embodiments, the IPT-PQ color space is represented as a space of I', P', and T' code words available to encode video content.

I', P', and T' code words represented in the IPT-PQ color space may be perceptually quantized (PQ), gamma compressed (GC), etc., and may be mapped to I, P, and Q code words in the IPT color space in one or more of a variety of ways (e.g., by transfer functions such opto-electro transfer functions, by lookup tables (LUTs) such as 3D-LUTs, by fixed or parametrized mapping curves, by piecewise line segments with offsets, slopes and pivots, by matrixes, by power functions, by analytical functions, by sigmoid functions, by logarithmic functions, by integration expressions, etc.).

In some embodiments, the video encoder converts the I', P', and T' code words in the input image "IMG2" to I, P, and Q code words in the IPT color space, based on a third forward transformation F3, which is defined as a forward transformation from the IPT-PQ color space to the IPT color space.

The conversion from the I', P', and T' code words in the input image "IMG" to the I, P, and Q code words in the IPT color space, based on the first forward transformation F1, may be represented in the following expression:

$$\text{IMG\_Linear2}=F3(\text{IMG2}) \quad (8)$$

where IMG_Linear2 is a (e.g., 3×N, etc.) matrix representing the linearized video content (or an image in a sequence of images therein) comprising the I, P and Q code words in the IPT color space. The linearized video content (or an image in a sequence of images therein) may comprise an array or a matrix of IPT component values in the IPT color space.

In block 126, the video encoder determines whether the linearized video content is encoded in a subsampling color space. A subsampling color space as described herein may refer to a specific linear color space in which downsampling operations (e.g., in spatial dimensions, etc.) may be performed as a part of compressing video content for transmission or delivery to downstream recipient devices.

In response to determining that the linearized video content is encoded in the subsampling color space, the video encoder skips block 128. The process flow goes directly to block 130.

On the other hand, in response to determining that the linearized video content is not encoded in the subsampling color space, the video encoder converts the linearized video content (in the IPT color space in this example) to the subsampling color space in block 128. The process flow then goes to block 130.

For the purpose of illustration, the subsampling color space is an XYZ color space. The conversion from the IPT color space to the XYZ color space in block 108 may be represented in the following expression:

$$\begin{bmatrix} X \\ Y \\ Z \end{bmatrix} = M2 * \text{IMG\_Linear2} \quad (9)$$

where $$\begin{bmatrix} X \\ Y \\ Z \end{bmatrix}$$

is a (e.g., 3×N, etc.) matrix representing video content (or an image in a sequence of images therein) in the XYZ color space, and M2 represents a (e.g., 3×3, etc.) transformation matrix from the IPT color space to the XYZ color space.

In block 130, the video encoder downsamples the video content in the XYZ color space to generate downsampled video content. Any in a number of resampling methods may be used by the video encoder to generate the downsampled video content. A resampling method for downsampling video content as described herein may include, but is not limited to only, an interpolation-based method such as bilinear interpolation, bicubic interpolation, etc.

In some embodiments, to obtain the downsampled video content, the video encoder may use bilinear interpolation to scale down the spatial resolution of the linearized video content in the XYZ color space, as given in expression (4).

In block 132, the video encoder processes each downsampled image in the sequence of downsampled images represented by the downsampled video content, and converts downsampled image data in the sequence of downsampled images from the XYZ color space to a pre-transmission color space (e.g., an X'Y'Z' color space, etc.). The conversion from the X, Y, and Z code words in the XYZ color space to the X'Y'Z' code words in the X'Y'Z' color space may be based on the second inverse transformation F2', as represented in expression (5).

In block 136, the video encoder processes each downsampled image in a sequence of downsampled images represented by the downsampled non-linearized video content, and generates opponent channel code words, Dz and Dx, based on X'$_{DS}$, Y'$_{DS}$, and Z'$_{DS}$ code words in each downsampled image in the sequence of downsampled images, as shown in expressions (6a) and (6b).

In block 134, the video encoder maps luminance values Y in the XYZ color space obtained before downsampling operations performed in block 110 to (non-linear) luma value Y', as shown in expression (7).

In block 138, the video encoder generates output video content comprising the opponent channel code words Dz and Dx obtained from the downsampled non-linearized video content and the luma values Y' mapped from the pre-downsampled luminance values in a transmission color space (e.g., an Y'DzDx color space, etc.). The output video content may be transmitted (e.g., by the video encoder, etc.), delivered, etc., to one or more recipient modules, units, devices, etc.

In an example embodiment, the output video content comprises a sequence of output images that correspond to the sequence of input images in the input video content. An output image may comprise component values in the transmission color space that are carried in a specific sampling format (e.g., a 4:4:0 sampling format, a 4:2:2 sampling format, a 4:2:0 sampling format, etc.).

5. IMAGE CONSTRUCTION BASED DOWNSAMPLED IMAGE DATA

Figure 1C:
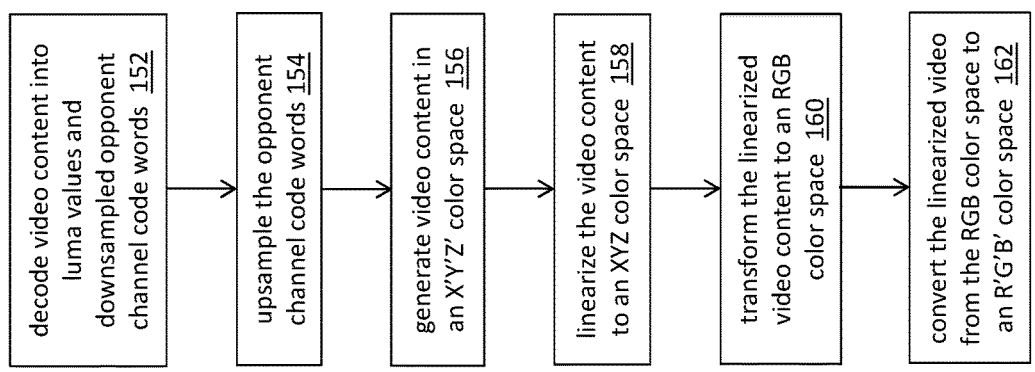
FIG. 1C and FIG. 1D illustrates example process flows for constructing images based on video content comprising downsampled image data in opponent channels.
Figure 1D:
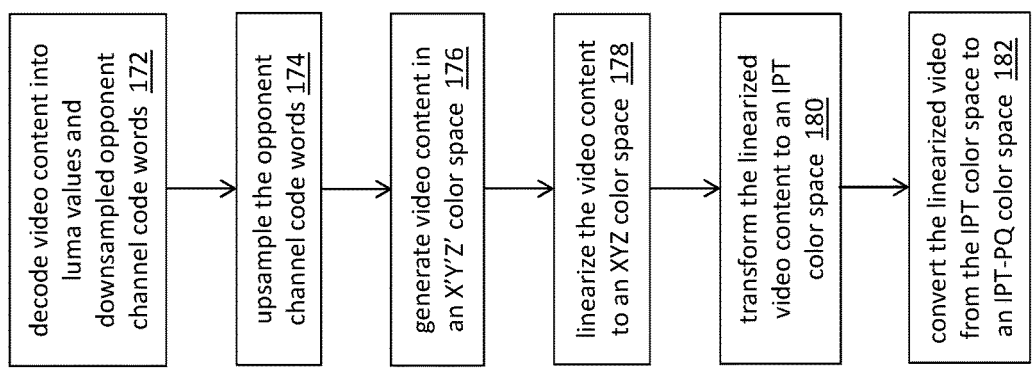

FIG. 1C and FIG. 1D illustrate example process flows 150-1 and 150-2 for constructing images based on video content comprising downsampled image data in opponent channels. In some embodiments, a video decoder (e.g., a video codec, a video transcoder, etc.) as described herein may be configured to perform the process flow.

In an example embodiment, the video decoder is configured to receive video content encoded in a transmission color space (e.g., Y'DzDx color space, etc.). The video content as received by the video decoder may, but is not limited to only, be generated by a video encoder as illustrated in FIG. 1A or FIG. 1B.

6. EXAMPLE IMAGE CONSTRUCTION IN R'G'B' COLOR SPACES

Techniques as described herein can be applied to reconstructing images from video content comprising downsampled opponent channel image data in an R'G'B' color space. As illustrated in FIG. 1C, in block 152 of process flow 150-1, the video decoder decodes the video content into a sequence of decoded images each of which comprises luma values Y' and downsampled non-linear opponent channel code words Dz and Dx in the transmission color space. In some embodiments, the transmission color space (the Y'DzDx color space in the present example) is related to a post-transmission color space such as an X'Y'Z' color space, etc. The X'Y'Z' color space may, but is not limited to only, any of: perceptually quantized color spaces, gamma compressed color spaces, etc.

In block 154, the video decoder upsamples the opponent channel code words Dz and Dx in each image in the sequence of decoded images to generate upsampled opponent channel code words Dz$_{us}$ and Dx$_{us}$. Any of a wide variety of resampling methods can be used for upsampling the opponent channel code words Dz and Dx. For the purpose of illustration, the resampling method used for upsampling the opponent channel code words Dz and Dx into the upsampled opponent channel code words Dz$_{us}$ and Dx$_{us}$ may be given in the following expression:

$$\begin{bmatrix} D_{Z_{US}} \\ D_{X_{US}} \end{bmatrix} = \text{resize}([DZ, DX], 2, \text{bilinear}) \qquad (10)$$

where $$\begin{bmatrix} D_{Z_{US}} \\ D_{X_{US}} \end{bmatrix}$$

is a (e.g., 3×N, etc.) matrix representing the upsampled opponent channel code words, and resize([X,Y,Z],2,bilinear) represents the same bilinear interpolation operations performed individually on each opponent channel Dz or Dx to scale up (e.g., increase to twice of, etc.) each linear spatial resolution in both horizontal and vertical directions. For example, the number of pixels (or the amount of image data) in the upsampled video content after the upsampling operations in expression (10) may be four times (4×) the number of pixels (or the amount of image data) in the video content before the upsampling operations in expression (10).

In block 156, the video decoder generates non-linear code words X', Y', and Z' in the pre-transmission color space, based on the luma values Y' and the upsampled opponent channel code words Dz$_{us}$ and Dx$_{us}$, as shown in the following expressions:

$$X' = Dx_{US}*2 + Y' \quad (11)$$

$$Y' = Y' \quad (12)$$

$$Z' = Dz_{US}*2 + Y' \quad (13)$$

In block 158, the video decoder generates linearized video content by mapping the non-linear code words X', Y' and Z' in the X'Y'Z' color space to linear code words X, Y and Z in a XYZ color space, as shown in the following expression:

$$\begin{bmatrix} X \\ Y \\ Z \end{bmatrix} = F2\left(\begin{bmatrix} X' \\ Y' \\ Z' \end{bmatrix}\right) \quad (14)$$

where F2 represents a second forward transformation that is an inverse to the second inverse transformation F2' in expression (5). For example, F2 may represent an EOTF (e.g., SMPTE ST 2084) and F2' may represent its inverse EOTF or OETF.

In block 160, the video decoder converts the linearized video content in the XYZ color space to linearized video content in a linear color space that is related to an output color space. By way of example, the output color space is an R'G'B' color space, and the linear color space related to the output color space is an RGB color space. The conversion from the XYZ color space to the RGB color space may be represented in the following expression:

$$RGB = M^{-1} * \begin{bmatrix} X \\ Y \\ Z \end{bmatrix} \quad (15)$$

where $M^{-1}$ represents a (e.g., 3×3, etc.) transformation matrix from the XYZ color space to the RGB color space, and an inverse to the transformation matrix M in expression (2).

In block 162, the video decoder converts the linearized video content in the RGB color space to non-linearized video content in the R'G'B' color space. In a non-limiting example, the video decoder converts the linearized video content to the non-linearized video content, based on a first inverse transformation F1', which may be an inverse to the first forward transformation F1 as illustrated in FIG. 2A, as given in the following expression:

$$IMG' = F1'(RGB) \quad (16)$$

where IMG' represents a reconstructed version of the input image IMG in expression (1), and RGB represents the left hand side (LHS) in expression (15).

In some embodiments, the non-linearized video content in the R'G'B' color space comprises a sequence of output images that are a reconstructed version of the sequence of input (R'G'B') images as processed by the video encoder in process flow 100-1 as previously described.

7. EXAMPLE IMAGE CONSTRUCTION IN IPQ-PQ COLOR SPACES

Techniques as described herein can be applied to reconstructing images from video content comprising downsampled opponent channel image data in color spaces other than an R'G'B' color space. As illustrated in FIG. 1D, in block 172 of process flow 150-2, the video decoder decodes the video content into a sequence of decoded images each of which comprises luma values Y' and downsampled non-linear opponent channel code words Dz and Dx in the transmission color space. In some embodiments, the transmission color space (the Y'DzDx color space in the present example) is related to a post-transmission color space such as an X'Y'Z' color space, etc. The X'Y'Z' color space may, but is not limited to only, any of: perceptually quantized color spaces, gamma compressed color spaces, etc.

In block 174, the video decoder upsamples the opponent channel code words Dz and Dx in each image in the sequence of decoded images to generate upsampled opponent channel code words $Dz_{us}$ and $Dx_{us}$. Any of a wide variety of resampling methods can be used for upsampling the opponent channel code words Dz and Dx. For the purpose of illustration, the resampling method used for upsampling the opponent channel code words Dz and Dx into the upsampled opponent channel code words $Dz_{us}$ and $Dx_{us}$ may be given in expression (10). For example, the number of pixels (or the amount of image data) in the upsampled video content after the upsampling operations in expression (10) may be four times (4×) the number of pixels (or the amount of image data) in the video content before the upsampling operations in expression (10).

In block 176, the video decoder generates non-linear code words X', Y', and Z' in the post-transmission color space, based on the luma values Y' and the upsampled opponent channel code words $Dz_{us}$ and $Dx_{us}$, as shown in expressions (11) through (13).

In block 178, the video decoder generates linearized video content by mapping the non-linear code words X', Y', and Z' in the X'Y'Z' color space to linear code words X, Y and Z in a XYZ color space, as shown in expression (10).

In block 180, the video decoder converts the linearized video content in the XYZ color space to linearized video content in a linear color space that is related to an output color space. By way of example, the output color space is an IPT-PQ color space, and the linear color space related to the output color space is an IPT color space. The conversion from the XYZ color space to the IPT color space may be represented in the following expression:

$$IPT = M2^{-1} * \begin{bmatrix} X \\ Y \\ Z \end{bmatrix} \quad (17)$$

where $M2^{-1}$ represents a (e.g., 3×3, etc.) transformation matrix from the XYZ color space to the IPT color space, and an inverse to the transformation matrix M2 in expression (11).

In block 182, the video decoder converts the linearized video content in the IPT color space to non-linearized video content in the IPT-PQ color space. In a non-limiting example, the video decoder converts the linearized video content to the non-linearized video content, based on a third inverse transformation F3', which may be an inverse to the third forward transformation F3 in expression (10), as given in the following expression:

$$IPT' = F3'(IPT) \quad (18)$$

where IPT' represents a reconstructed version of the input image IMG2 in expression (10), and IPT represents the left hand side (LHS) in expression (15).

In some embodiments, the non-linearized video content in the IPT-PQ color space comprises a sequence of output images that are a reconstructed version of the sequence of input (IPT-PQ) images as processed by the video encoder in process flow 100-2 as previously described.

8. RESHAPING COLOR GAMUT

When wide gamut video content is encoded, only a small fraction of an available code word space is actually occupied by code words representing colors in the wide gamut video content. For example, in many a color space such as YDzDx, IPT, YCbCR, etc., images may occupy to various extents only small fractions of available code word spaces. In particular, when a relatively low bit depth code word space (e.g., 8 bits, 10 bits, etc.) that comprises a relatively small number of available quantized values is used to encode video content, significant errors such as coding errors, quantization errors, etc., can be introduced into the encoded video content. As used herein, the term "bit depth" refers to the number of bits provided in a coding space that provides available code words to encode or quantize image data; an example of low bit depth is 8 bits; an example of high bit depth is 12 bits or more.

Figure 3A:
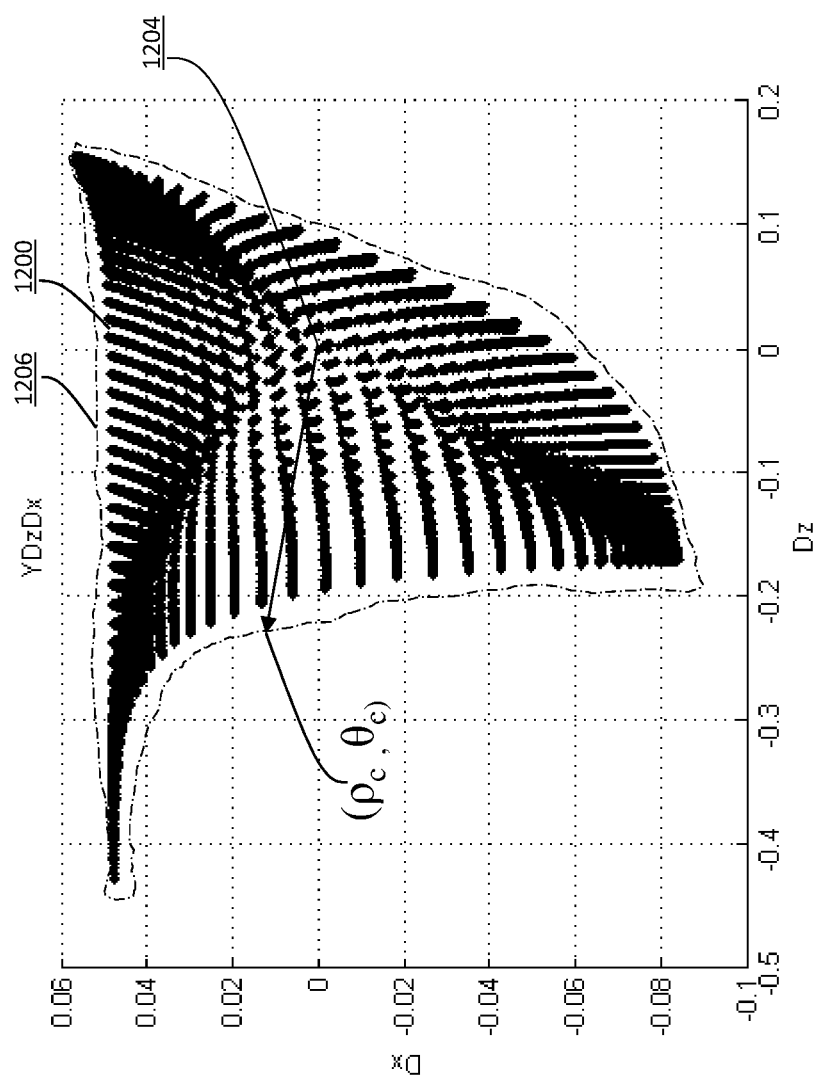
FIG. 3A illustrates an example color gamut or a portion thereof to be reshaped.

Linear scaling that linearly scales each axis in orthogonal axis of a code word space cannot fully utilize the code word space, as a shape enclosing a color gamut with all possible colors that can be used in encoding video content is not a regular shape (e.g., a rectangle, etc.) to begin with. For example, as illustrated in FIG. 3A, the Rec. 2020 color gamut (or a portion thereof used to encode video content) as represented in an YDzDx color space is not a regular shape. Therefore, it is difficult, even impossible, for linear scaling to produce efficient usage of available code word ranges for Dz and Dx in the YDzDx color space for encoding video content with colors defined by the Rec. 2020 color gamut.

Figure 3B:
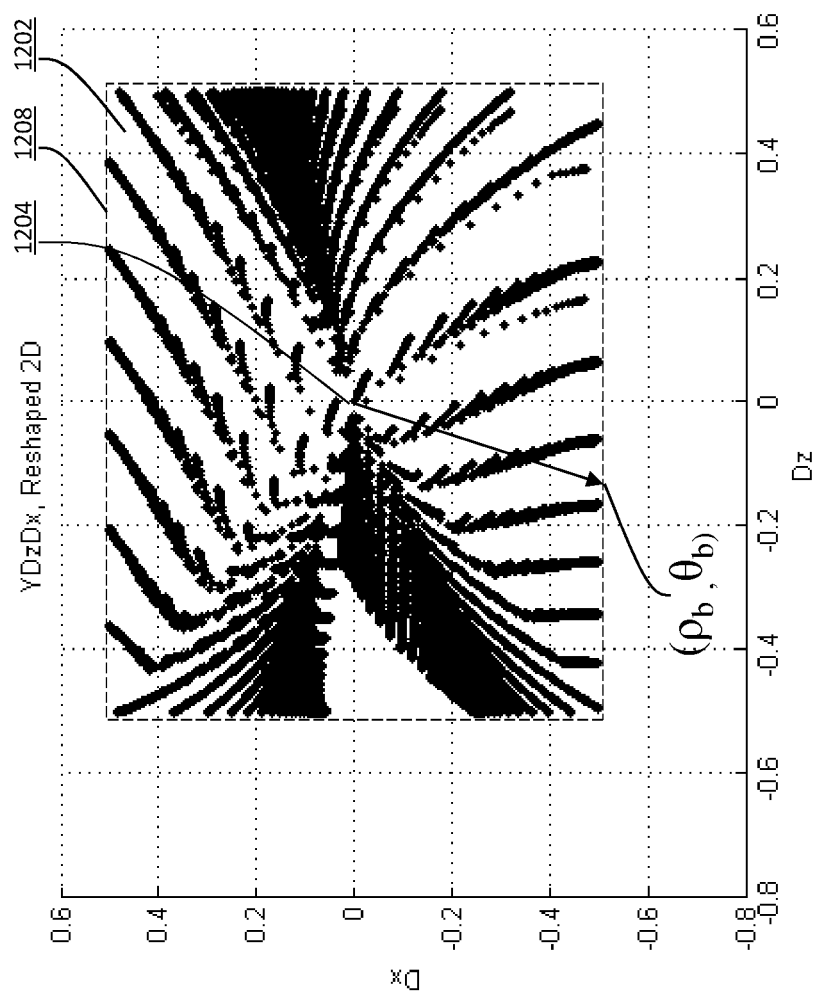
FIG. 3B illustrates an example reshaped color gamut or a portion thereof.

Techniques as described herein may be used to reshape an arbitrary color gamut as represented in a color space into a reshaped color gamut that better utilizes available ranges of code words in the color space. As illustrated in FIG. 3B, a color gamut such as the Rec. 2020 of FIG. 3A may be reshaped into a reshaped Rec. 2020 color gamut that better utilizes available code word ranges in the YDzDx color space.

Figure 1E:
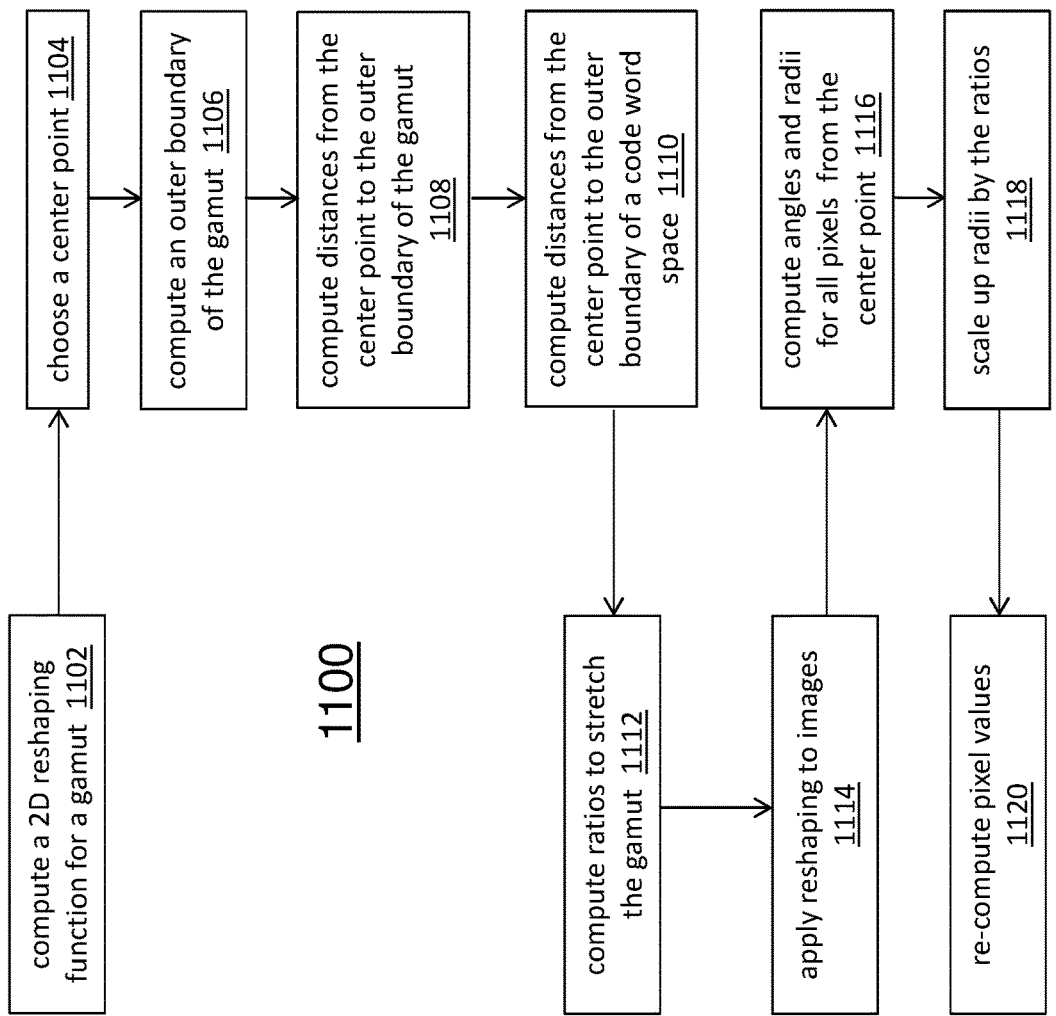
FIG. 1E illustrates an example process flow for encoding video content into a reshaped color gamut in a color space.

FIG. 1E illustrates an example process flow 1100 for encoding video content into a reshaped color gamut in a color space. In some embodiments, a video encoder (e.g., a video codec, a video transcoder, etc.) as described herein may be configured to perform process flow 1100.

In an example embodiment, the video encoder is configured to determine a color gamut (e.g., 1200 of FIG. 3A, etc.) to be reshaped in the color space with process flow 1100. Examples of color gamut as described herein may be, but are not limited to only, be any of: a standard based color gamut such as a Rec. 2020 color gamut, a P3 color gamut, etc.; a device-dependent color gamut (or a device-dependent portion of a color gamut) that is specific to one or more display devices; a color gamut that is specific to one or more types of display devices; a scene-dependent color gamut (or a scene-dependent portion of a color gamut) that is specific to a group of pictures or a scene in a media program; an image-dependent color gamut (or an image-dependent portion of a color gamut) that is specific to one or more images; etc. The color space may comprise a code word space (e.g., 1202 of FIG. 3B, etc.) having a set of code words available to encode video content. Examples of color spaces in which a color gamut or a (used) portion thereof may be reshaped by techniques as described herein include, but are not limited to only, any of: RGB color spaces, an R'G'B' color spaces, IPT color spaces, IPT-PQ color spaces, XYZ color spaces, X'Y'Z' color spaces, YDzDx color spaces, Y'DzDx color spaces, YCbCr color spaces, etc. In some embodiments, the color gamut (1200) to be reshaped may initially be normalized (e.g., by linear scaling, by rotations, by translations, etc.) to fit within normalized ranges of the code word space.

In block 1102, the video encoder computes/derives a (e.g., 1D, 2D, 3D, etc.) color gamut reshaping function by performing a number of steps in blocks 1104 through 1112.

In block 1104, the video encoder chooses a center point (e.g., 1204 of FIG. 3A or FIG. 3B, etc.) for the color gamut (1200). The center point (1204) may correspond to a white point—within the color gamut (1200)—that represents white in some or all images to be encoded. The center point (1204) may be chosen to be D65, but may also be chosen to be a point other than D65. For example, the video encoder may set a different white point for some images that have strong color tints (e.g., a creative white point such as sepia for mimicking classic photo images, etc.). Additionally, optionally, or alternatively, the white point may or may not be the origin of a coordinate system adopted for the code word space. For example, D65 may be mapped to the origin (0, 0) of a coordinate system adopted for a code word space in the YDzDx color space. However, D65 may be mapped to off-center in a coordinate system adopted for a code word space in the YDzDx color space.

In block 1106, the video encoder determines/computes an outer boundary (e.g., 1206 of FIG. 3A, etc.) of the color gamut (1200). A variety of different ways can be used to determine the outer boundary (1206). The closer the outer boundary (1206) matches the color gamut (1200) to be reshaped, the better the reshape performance, but the higher the computational cost. In some embodiments, the video encoder determines the outer boundary (1206) by first locating or finding the outermost points on the color gamut (1200) relative to the center point (1204). The outermost points relative to the center point on the outer boundary (1206) provide ranges or limits for possible colors in encoded video content. The video encoder can then determine/generate the outer boundary (1206) of the color gamut (1200) by connecting the outermost points to form an enclosure of the color gamut (1200). Additionally, optionally, or alternatively, alpha-shape based techniques may be used to connect the outermost points, which may be disjoint from one another, into the outer boundary (1206). Furthermore, instead of being represented or approximated by complex shapes, the outer boundary (1206) of the color gamut (1200) can be simplified or approximated with a convex hull, or a relatively simple geometrical shape such as a triangle, rectangle, etc.

In block 1108, the video encoder computes/derives a combination of a radius and an angle, denoted respectively as $\rho_c$ and $\theta_c$, for each first point in a plurality of first points on the outer boundary (1206) of the color gamut (1200). The radius $\rho_c$ may represent a magnitude of a displacement (e.g., a Euclidean distance, a L2 norm, a different norm or measure of displacement, etc.) between the center point (1204) and the first point on the outer boundary (1206). The angle $\theta_c$ may represent an angle between a reference direction such as a positive horizontal direction of the coordinate system adopted for the code word space and a point-specific direction from the center point (1204) to the first point on the outer boundary (1206). Radii and angles of points on the outer boundary (1206) can be determined/derived by numerical computations, functional computations, interpolations, etc.

In block 1110, the video encoder computes/derives a combination of a radius and an angle, denoted respectively as $\rho_b$ and $\theta_b$, for each second point in a plurality of second points on the boundary (e.g., 1208 of FIG. 3B, etc.) of the code word space (1202). The radius $\rho_b$ may represent a magnitude of a displacement (e.g., a Euclidean distance, a L2 norm, a different norm or measure of displacement, etc.) between the center point (1204) and the second point on the boundary (1208) of the code word space (1202). The angle $\theta_b$ may represent an angle between the previously mentioned reference direction such as a positive horizontal direction of the coordinate system adopted for the code word space and a point-specific direction from the center point (1204) to the second point on the boundary (1208) of the code word space (1202). Radii and angles of points on the boundary (1208) can be determined/derived by numerical computations, functional computations, interpolations, etc. In some embodiments, the boundary (1208) may represent a unit square centered at (0, 0) of the coordinate system adopted for the code word space (1202) in an YCbCb color space.

In block 1112, the video encoder computes/derive a reshaping gain, denoted as $\rho_{gain}$, for each first point in the plurality of first points on the outer boundary (1206) of the color gamut (1200).

In some embodiments, individual second points in the plurality of second points on the boundary (1208) of the code word space (1202) may respectively correspond to individual first points in the plurality of first points on the outer boundary (1206) of the color gamut (1200). For example, a first point in the plurality of first points and a corresponding second point in the plurality of second points may lie on the same line originated radially from the center point (1204). The reshaping gain $\rho_{gain}$ for the first point may simply be computed as a ratio of $\rho_b$ over $\rho_c$, where $\rho_c$ is the distance of the first point (on the outer boundary 1206 of the color gamut 1200) to the center point (1204) and $\rho_b$ is the distance of a second point (on the boundary 1208 of the code word space 1202) corresponding to the first point.

Additionally, optionally, alternatively, in embodiments in which first points and second points do not necessarily lie on same lines originated or emitted from the center point (1204), interpolation may be used by the video codec to estimate a radius from the center point (1204) to a second point on the boundary (1208) that lies on the same line stretching radially from the center point (1204) through a first point on the outer boundary 1206 of the color gamut 1200. The estimated radius for the second point and a radius computed for the first point may be used to derive a reshaping gain $\rho_{gain}$. Reshaping gains $\rho_{gain}$ and angles $\theta_b$, as computed for the plurality of first points on the outer boundary (1206) of the color gamut (1200), collectively represent the color gamut reshaping function that maps the angles $\theta_b$ to the reshaping gains $\rho_{gain}$ for the plurality of first points on the outer boundary (1206) of the color gamut (1200).

In block 1114, the video encoder applies the color gamut reshaping function to video content to be encoded by performing a number of steps in blocks 1116 through 1120. In some embodiments, the video content may initially be encoded with code words in the color gamut (1200) before the reshaping of the color gamut (1200).

In block 1116, the video encoder computes/derives a combination of a radius and an angle, denoted respectively as $\rho$ and $\theta$, for each pixel in the video content, for example, based on Dz and Dx values of that pixel in the video content. The radius $\rho$ may represent a magnitude of a displacement (e.g., a Euclidean distance, a L2 norm, a different norm or measure of displacement, etc.) between the center point (1204) and a point in the color gamut (1200) that represents that pixel. The angle $\theta$ may represent an angle between the previously mentioned reference direction such as a positive horizontal direction of the coordinate system adopted for the code word space and a point-specific direction from the center point (1204) to the point that represents the pixel.

In block 1118, the video encoder scales radii $\rho$ computed for all pixels in the video content, as given in the following expression:

$$\rho' = \rho * \text{interp1}(\theta_c, \rho_{gain}, \theta) \quad (19)$$

where interp1( . . . ) is an interpolation function, for example, implemented by MATLAB or the like; $\theta_c$ is an array of angles for the plurality of first points on the outer boundary (1206) of the color gamut (1200); $\rho_{gain}$ is an array of gains dependent on $\theta_c$, as specified in the color gamut scaling function; and $\rho'$ is a new radius of the pixel scaled from the radius $\rho$ of the pixel with an interpolated gain given by interp1( . . . ) for the angle $\theta$ of the pixel.

In block 1118, the video encoder computes new code words (e.g., new Dz and Dx values, etc.) for the pixel from the original $\theta$ of the pixel and the new radius $\rho'$ of the pixel, and generates new video content by replacing the code words (e.g., the Dz and Dx values, etc.) before reshaping with the new code words (e.g., new Dz and Dx values, etc.) scaled for all represented pixels. The new video content comprising the scaled code words may be transmitted or delivered to one or more downstream recipient devices.

Figure 1F:
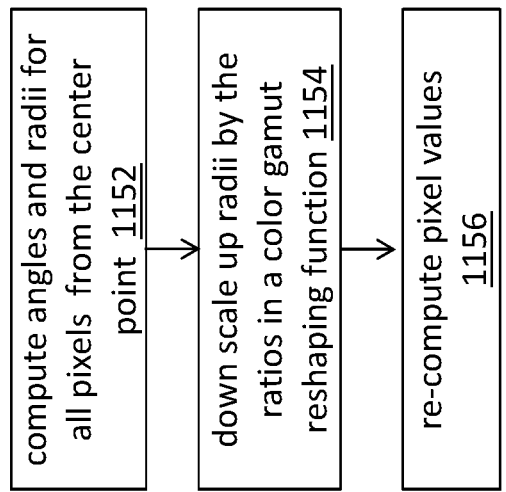
FIG. 1F illustrates an example process flow for decoding video content with scaled code words in a reshaped color gamut in a color space.

Techniques as described herein may be used to recover image data in a color gamut that has been reshaped in a color space to better utilize available ranges of code words in the color space. FIG. 1F illustrates an example process flow 1150 for decoding video content with scaled code words in a reshaped color gamut in a color space. In some embodiments, a video decoder (e.g., a video codec, a video transcoder, etc.) as described herein may be configured to perform process flow 1150.

In an example embodiment, the video decoder is configured with a color gamut reshaping function, a center point (e.g., 1204 of FIG. 3A or FIG. 3B, etc.), etc., such as discussed in connection with the process flow (1100). The color gamut reshaping function may be represented by a mapping that maps angles $\theta_b$ to reshaping gains $\rho_{gain}$ for a plurality of first points on the outer boundary (1206) of the color gamut (1200). The color gamut reshaping function, the center point (1204), etc., may be derived or determined by the video decoder in a variety of ways. In an example, one or more of the color gamut reshaping function, the center point (1204), etc., may be delivered as metadata from an upstreaming video encoder directly or indirectly (e.g., through intermediate device, through intermediate storage media, etc.) to the video decoder. The color gamut reshaping function may be represented by a LUT that comprises a first array of angles $\theta_b$ for the plurality of first points on the outer boundary (1206) of the color gamut (1200) as keys and a second array of corresponding reshaping gains $\rho_{gain}$ as values. The color gamut reshaping function may be represented by a set of piecewise line (PWL) segments comprising offsets, pivots, slopes, etc. In another example, the video decoder may implement similar functionality to that implemented in the video encoder to derive independently one or more of the color gamut reshaping function, the center point (1204), etc.

In block 1152, the video decoder computes/derives a combination of a radius and an angle, denoted respectively as $\rho'$ and $\theta$, for each pixel in the video content, for example, based on Dz and Dx values of that pixel in the video content. The radius ρ' may represent a magnitude of a displacement (e.g., a Euclidean distance, a L2 norm, a different norm or measure of displacement, etc.) between the center point (1204) and a point in the code word space (1202) that represents that pixel. The angle θ may represent an angle between the previously mentioned reference direction such as a positive horizontal direction of the coordinate system adopted for the code word space and a point-specific direction from the center point (1204) to the point that represents the pixel.

In block 1154, the video decoder downscales radii ρ' computed for all pixels in the video content, as given in the following expression:

$$\rho = \rho'/\mathrm{interp1}(\theta_c, \rho_{gain}, \theta) \quad (20)$$

where interp1( . . . ) is the same interpolation function in expression (18), and ρ is a new radius of the pixel downscaled from the radius ρ' of the pixel with an interpolated factor given by interp1( . . . ) for the angle θ of the pixel.

In block 1156, the video decoder computes new code words (e.g., new Dz and Dx values, etc.) for the pixel from the original θ of the pixel and the new radius ρ of the pixel, and generates new video content by replacing the code words (e.g., the Dz and Dx values, etc.) after reshaping with the new code words (e.g., new Dz and Dx values, etc.) downscaled for all represented pixels. In some embodiments, the new video content comprising the downscaled code words may be rendered on a display panel.

For the purpose of illustration only, a color gamut reshaping function has been described as dependent on angles θ. In various other embodiments, a color gamut reshaping function can be represented in different ways other than one dependent on angles θ. For example, instead of performing color gamut reshaping based on a (1D) function dependent on angles θ, the video codec can perform color gamut based on a (2D) function, LUT, etc., dependent on two coordinates such as Dz and Dx coordinates, etc.

In some embodiments, a color gamut to be reshaped can be represented as a three dimensional (3D) volume in a 3D color space. The color gamut may have cross sectional areas in the top and/or bottom regions of the 3D volume much smaller than those in the middle region of the 3D volume. A cross sectional area may, but is not limited to, be a two dimensional area in which a component such as a luma value, a luminance value, a RGB value, etc., of the 3D color space.

A video codec as described herein can be configured to reshape the color gamut to even better utilize (e.g., across a wide range of luminance values, etc.) a code word space available in the 3D color space. In some embodiments, the video codec may determine or select a center point for the color gamut to be reshaped. In an example, the center point may be selected to be a point in a specific cross sectional area of the 3D volume. The specific cross sectional area may be the largest cross sectional area in the 3D volume. In another example, the center point may be selected to a center of mass of the 3D volume as weighed by a density function such as a uniform density function, a non-uniform density function, etc. In yet another example, the center point may be selected as a specific point (e.g., a white point, etc.) in the color gamut. In a further example, the center point may be selected as a point in a specific plane in a coordinate system (e.g., where a specific coordinate value is zero, a half value, etc.).

A specific point in the color gamut to be reshaped may be characterized or determined by a radius ρ (e.g., a distance) of the specific point to the center point, a first angle θ within a projected plane such as one coplanar with a cross sectional area in which the center point is located, a second angle φ between a line from the center point to the specific point and the cross sectional area (corresponding to the elevation of the specific point above or below a cross sectional area that includes the center point).

In some embodiments, the video codec can determine or approximate an outer boundary of the color gamut to be reshaped, a boundary of a code word space available in the 3D color space, radii of first points on the outer boundary of the color gamut to be reshaped, radii of second points on the boundary of the code word space, reshaping gains, etc., using techniques similar to those applied in reshaping a 2D color gamut. The reshaping gains, first angles θ, second angles φ can be used as a 3D color gamut reshaping function.

Additionally, optionally, or alternatively, color gamut reshaping operations as described herein may be combined with tone or gamut mapping (e.g., between different quantization precisions, between a set of code words in a first bit depth and a set of code words in a second different bit depth, etc.), effectively combining multiple steps into a single processing step.

9. EXAMPLE VIDEO CODECS

Figure 4A:
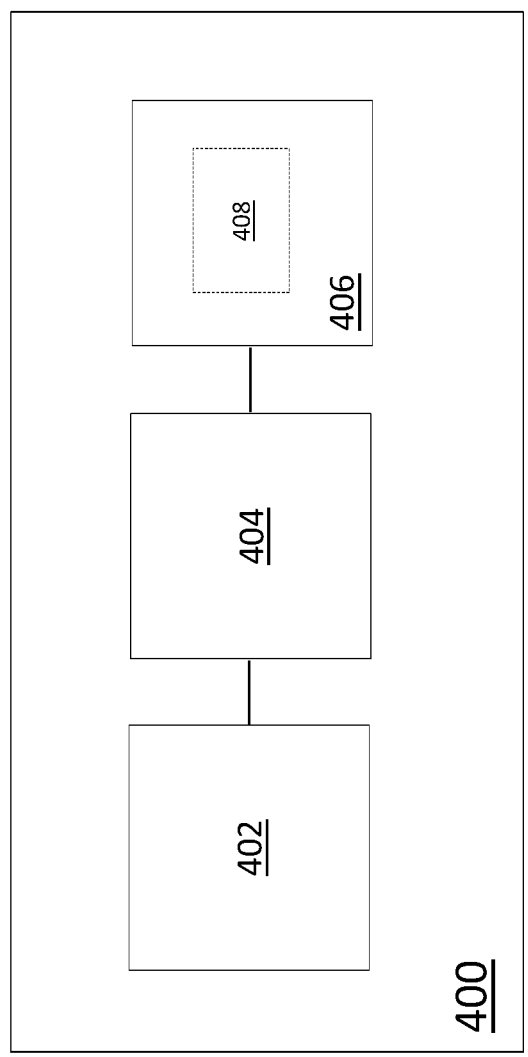

FIG. 4A illustrates an example video encoder 400 configured to perform one or more process flows as described herein. In some embodiments, the video encoder (400) comprises an input content processor 402, a downsampling module 404, an output content processor 406, etc.

In some embodiments, the input content processor (402) may comprise software, hardware, a combination of software and hardware, etc., configured to receive input video content. In some embodiments, the input video content may be decoded from an input video signal, an input bitstream, an input media file, etc., received by a media processing system that includes the video encoder (400). In some embodiments, the input content processor (402) is further configured to perform one or more video processing operations to transform the input video content into linearized video content in a subsampling color space.

In some embodiments, the downsampling module (404) may comprise software, hardware, a combination of software and hardware, etc., configured to downsampled the linearized video content in the subsampling color space, generate downsampled video content in a pre-transmission color space, etc.

In some embodiments, the output content processor (406) may comprise software, hardware, a combination of software and hardware, etc., configured to derive downsampled opponent channel data in a transmission color space from the downsampled video content in the pre-transmission color space, combine luminance data derived or mapped from the linearized video content in the subsampling color space with chroma data derived from the downsampled video content in the pre-transmission color space to generate downsampled video content in the transmission color space as output video content, etc. Additionally, optionally, or alternatively, the output content processor (406) may comprise a forward color gamut reshaping module (408) that is configured to perform color gamut reshaping operations as described herein to better utilize a code word space available in a color space such as the transmission color space. In some embodiments, the output content processor (406) may sent the output video content to one or more downstream modules, downstream devices in an output video signal, an output bitstream, an output media file, etc.

One or more of the operations performed by the video encoder (400) may be implemented using one or more of a plurality of codecs, including, but not limited to, any combination of: H.264/AVC/HEVC, MPEG-2, VP8, VC-1, or the like.

FIG. 4B illustrates an example video decoder 450 configured to perform one or more process flows as described herein. In some embodiments, the video decoder (450) comprises a downsampled content receiver 452, an upsampling module 454, an upsampled content generator 456, etc.

In some embodiments, the downsampled content receiver (452) may comprise software, hardware, a combination of software and hardware, etc., configured to receive downsampled video content in the transmission color space. Additionally, optionally, or alternatively, the downsampled content receiver (452) may comprise an inverse color gamut reshaping module (458) that is configured to perform inverse color gamut reshaping operations to recover or reconstruct code words from scaled code words that better utilize a code word space available in a color space such as the transmission color space.

In some embodiments, the upsampling module (454) may comprise software, hardware, a combination of software and hardware, etc., configured to derive downsampled opponent channel data in the transmission color space from the downsampled video content in the transmission color space, upsampled the downsampled opponent channel data, derive upsampled video content in a post-transmission color space (which may or may not be the same as the pre-transmission color space as previously mentioned), etc.

In some embodiments, the upsampled content generator (456) may comprise software, hardware, a combination of software and hardware, etc., configured to transform the upsampled video content in the post-transmission color space into output video content in an output color space.

One or more of the operations performed by the video decoder (450) may be implemented using one or more of a plurality of codecs, including, but not limited to, any combination of: H.264/AVC/HEVC, MPEG-2, VP8, VC-1, or the like.

10. EXAMPLE PROCESS FLOWS

Figure 5A:
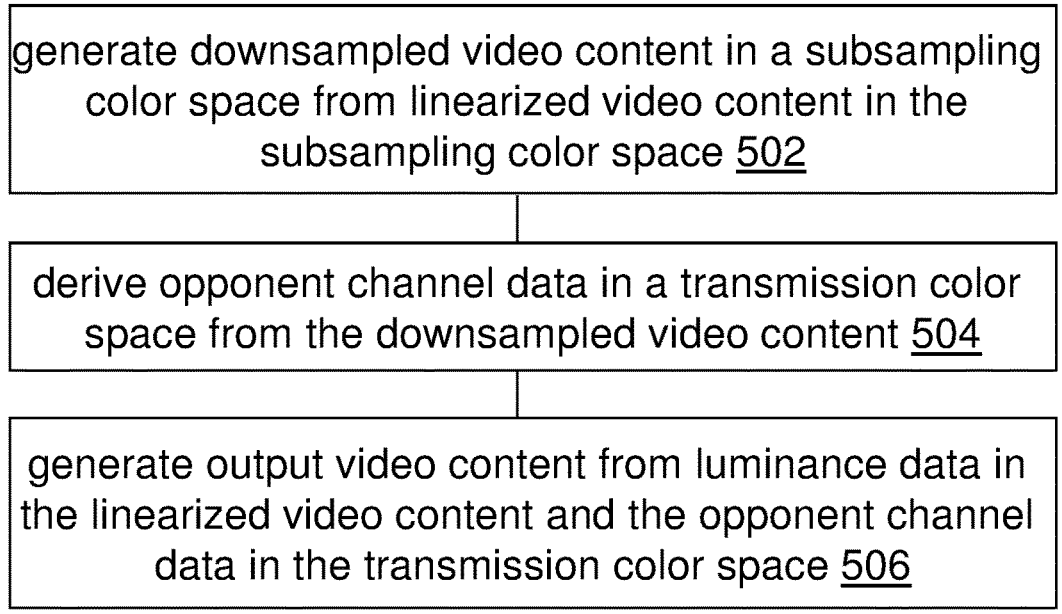

FIG. 5A illustrates an example process flow according to an example embodiment of the present invention. In some example embodiments, one or more computing devices or components may perform this process flow. In block 502, a video codec (e.g., 400 of FIG. 4A, etc.) generates downsampled video content in a subsampling color space from linearized video content in the subsampling color space. The linearized video content may represent a first spatial dimension, whereas the downsampled video content may represent a second spatial dimension lower than the first spatial dimension.

In block 504, the video codec derives opponent channel data in a transmission color space from the downsampled video content.

In block 506, the video codec generates output video content from luminance data in the linearized video content and the opponent channel data in the transmission color space.

In an embodiment, the video codec is further configured to transform input video content from an input color space to the linearized video content in the subsampling color space. In an embodiment, the input color space is one of an R'G'B' color space, an IPT-PQ color space, a specific perceptually quantized color space, etc.

In an embodiment, the subsampling color space represents a linear color space in which luminance data and chroma data are separated into different components of the subsampling color space. In an embodiment, the subsampling color space is one of an XYZ color space, an YCbCr color space, a specific luminance chrominance color space, etc.

In an embodiment, the linearized video content in the subsampling color space is derived from input video content is in a first media data container of a first sampling format, whereas output video data in the transmission color space is in a second media data container of a second sampling format different from the first sampling format.

In an embodiment, the video codec is further configured to map the downsampled video content in the subsampling color space to downsampled video content in a pre-transmission color space related to the transmission color space.

In an embodiment, the pre-transmission color space is an X'Y'Z' color space, whereas the transmission color space is an Y'DzDx color space.

In an embodiment, at least one of the linearized video content in the subsampling color space, the output video content in the transmission color space, etc., comprises component values derived based at least in part on a color gamut reshaping function.

FIG. 5B illustrates an example process flow according to an example embodiment of the present invention. In some example embodiments, one or more computing devices or components may perform this process flow. In block 552, a video codec (e.g., 450 of FIG. 4B, etc.) decodes luminance data and downsampled opponent channel data from video content in a transmission color space.

In block 554, the video codec generates upsampled opponent channel data from the downsampled opponent channel data. The upsampled opponent channel data may represent a first spatial dimension, whereas the downsampled opponent channel data may represent a second spatial dimension lower than the first spatial dimension.

In block 555, the video codec generates video content in an output color space from the luminance data decoded from the video content in the transmission color space and the upsampled opponent channel data.

In an embodiment, the output color space is one of an R'G'B' color space, an IPT-PQ color space, a specific perceptually quantized color space, etc.

In an embodiment, the video codec is further configured to convert the luminance data decoded from the video content in the transmission color space and the upsampled opponent channel data into upsampled video content in a post-transmission color space.

In an embodiment, the post-transmission color space is an X'Y'Z' color space, and wherein the transmission color space is an Y'DzDx color space.

In an embodiment, the video codec is further configured to downscale component values in the video content in the transmission color space based at least in part on a color gamut reshaping function.

In an embodiment, the luminance data in the video content in the transmission color space has a first spatial resolution, whereas the downsampled opponent channel data has a second spatial resolution lower than the first spatial resolution.

In an embodiment, the video codec is further configured to perform: generating upsampled video content in a post-transmission color space from the luminance data in the video content in the transmission color space and the upsampled opponent channel data; transforming the upsampled video content in the post-transmission color space to the video content in the output color space, etc.

In various example embodiments, an encoder, a decoder, a transcoder, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

11. IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
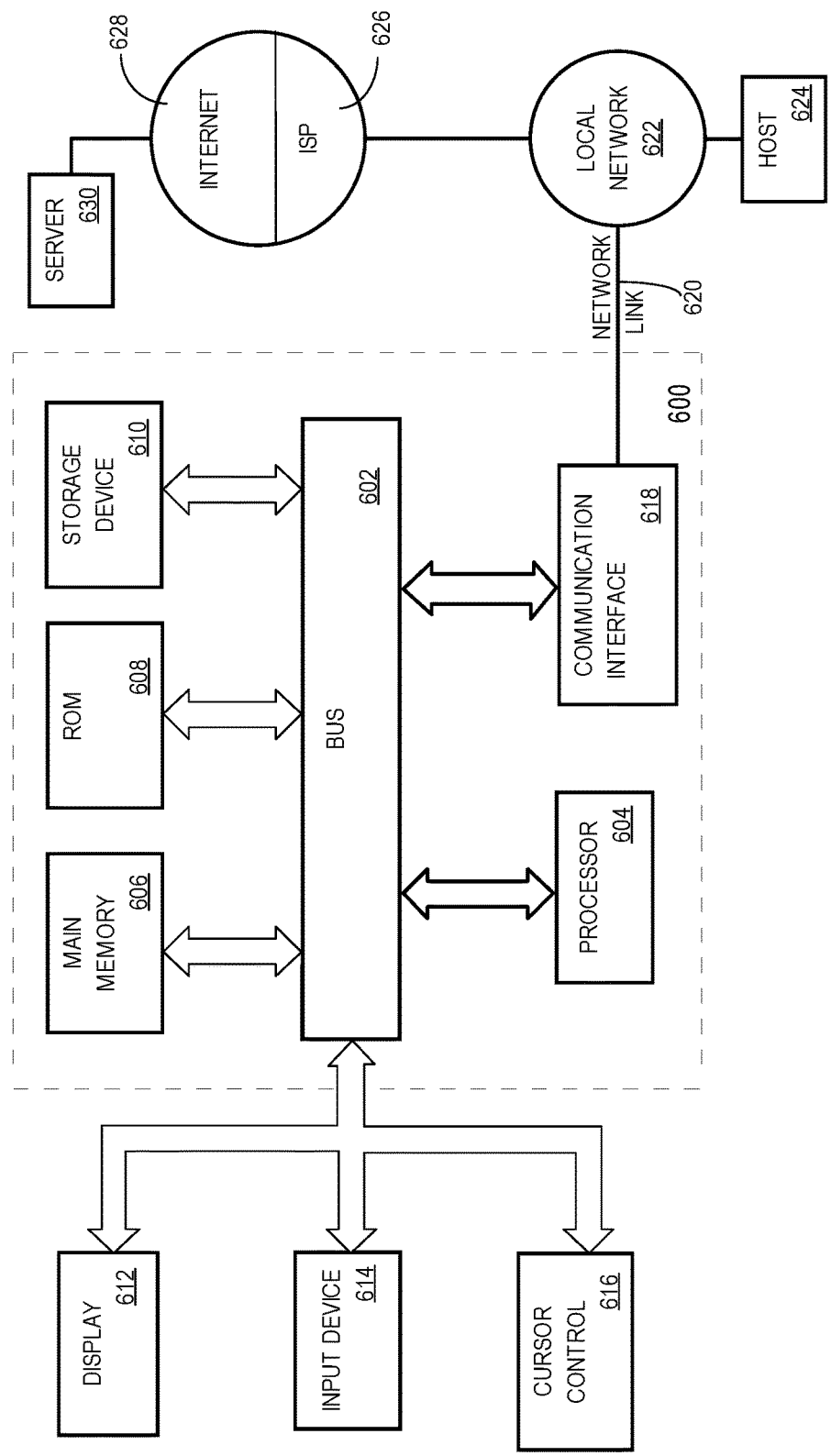
FIG. 6 illustrates an example hardware platform on which a computer or a computing device as described herein may be implemented.

For example, FIG. 6 is a block diagram that illustrates a computer system 600 upon which an example embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604.

A storage device 610, such as a magnetic disk or optical disk, is provided and coupled to bus 602 for storing information and instructions.

Computer system 600 may be coupled via bus 602 to a display 612, such as a liquid crystal display, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622.

For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

12. EQUIVALENTS, EXTENSIONS, ALTERNATIVES AND MISCELLANEOUS

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
    receiving an input video signal comprising input video content in an input color space;
    converting the input video content in the input color space to XYZ video content in an XYZ color space;
    encoding luma values in the XYZ video content into perceptually quantized (PQ) luma values in a PQ color space;
    downsampling chroma values in the XYZ video content into downsampled XYZ video content in the XYZ color space;
    generating, based at least in part on a combination of the PQ luma values and the downsampled XYZ video content, Y'DzDx video content in an Y'DzDx color space;
    wherein the method is performed by one or more computing devices.

2. The method of claim 1, further comprising linearizing the input video content before converting to the XYZ video content.

3. The method of claim 1, further comprising compressing the Y'DzDx video content into an output video signal.

4. The method of claim 1, wherein the XYZ video content representing a first spatial resolution, the downsampled XYZ video content representing a second spatial resolution lower than the first spatial resolution.

5. The method of claim 1, wherein the input color space is one of an YCbCr color space, an R'G'B' color space, an IPT-PQ color space, or another PQ color space.

6. The method of claim 1, wherein the input video content is in a first media data container of a first sampling format, and wherein the Y'DzDx video data is in a second media data container of a second sampling format different from the first sampling format.

7. The method of claim 1, further comprising applying a nonlinear mapping to the downsampled XYZ video content in the XYZ color space before generating the Y'DzDx video content in an Y'DzDx color space.

8. The method of claim 7, wherein the Y'DzDx is derived based at least in part on nonlinear downsampled X'Y'Z' video content generated by the nonlinear mapping.

9. The method of claim 1, further comprising applying a color gamut reshaping function to at least one of the XYZ video content, or the Y'DzDx video content.

10. The method of claim 9, wherein the color gamut reshaping function is generated by performing:
    determining a center point at a pre-mapped color gamut;
    identifying an outer boundary of the pre-mapped color gamut;
    determining first distances and first angles from the center point to boundary points at the outer boundary of the pre-mapped color gamut;
    determining second distances and second angles from the center point to points of an outer boundary of a code word space in which the pre-mapped color gamut is defined;
    generating the color gamut reshaping function as comprising a plurality of angles and a plurality of corresponding angle-dependent scaling ratios computed based on the first distances and the second distances.

11. The method of claim 9, wherein the color gamut reshaping function is applied to an image by performing:
    determining distances and angles of all pixels of the image from a center point that is used by the color gamut reshaping function as a reference point;
    determining scaling ratios based on the angles of all the pixels from the center point;
    applying scaling with the scaling ratios to the distances of all the pixels from the center point.

12. A method, comprising:
    receiving an Y'DzDx video signal comprising X'DzDx video content in an Y'DzDx color space;
    generating, based at least in part on the Y'DzDx video content in the Y'DzDx color space, PQ luma values and downsampled X'Y'Z' video content;
    upsampling chroma values in the downsampled X'Y'Z' video content into XYZ video content in the XYZ color space;

converting a combination of the PQ luma values and the XYZ video content in the XYZ color space to output video content in an output color space;

wherein the method is performed by one or more computing devices.

13. The method of claim 12, further comprising linearizing the downsampled X'Y'Z' video content before upsampling to the XYZ video content.

14. The method of claim 12, further comprising rendering the output video content on a display panel.

15. The method of claim 12, wherein the XYZ video content representing a first spatial resolution, the downsampled X'Y'Z' video content representing a second spatial resolution lower than the first spatial resolution.

16. The method of claim 12, wherein the output color space is one of an YCbCr color space, an R'G'B' color space, an IPT-PQ color space, or another PQ color space.

17. The method of claim 12, wherein the Y'DzDx video content is in a first media data container of a first sampling format, and wherein the output video data is in a second media data container of a second sampling format different from the first sampling format.

18. The method of claim 12, further comprising applying a nonlinear mapping to the downsampled X'Y'Z' video content before upsampling to the XYZ video content.

19. The method of claim 12, further comprising applying an inverse of a color gamut reshaping function that is used to generate the Y'DzDx video content.

20. A method, comprising:
receiving an input video signal comprising input video content in an input color space;
converting the input video content in the input color space to LMS video content in an LMS color space;
encoding values in the LMS video content into perceptually quantized (PQ) values in a LMS PQ color space;
encoding values in the LMS video content into IPT PQ values in an IPT PQ color space;
downsampling chroma values in the IPT PQ video content into downsampled IPT PQ video content in the IPT PQ color space;
generating, based at least in part on a combination of the IPT PQ intensity values and the downsampled IPT PQ chroma values, downsampled IPT PQ video content in the IPT PQ color space;
wherein the method is performed by one or more computing devices.

21. A method, comprising:
receiving an IPT PQ video signal comprising downsampled IPT PQ video content in an IPT PQ color space;
generating, based at least in part on the downsampled IPT PQ video content in the IPT PQ color space, IPT PQ intensity values and downsampled IPT PQ chroma values;
upsampling downsampled IPT PQ chroma values into upsampled IPT PQ chroma values in the IPT PQ color space;
converting a combination of the IPT PQ intensity values and the upsampled IPT PQ chroma values to output video content in an output color space;
wherein the method is performed by one or more computing devices.

22. A non-transitory computer readable storage medium, storing software instructions, which when executed by one or more processors cause performance of the method recited claim 1.

* * * * *